Figure 1:
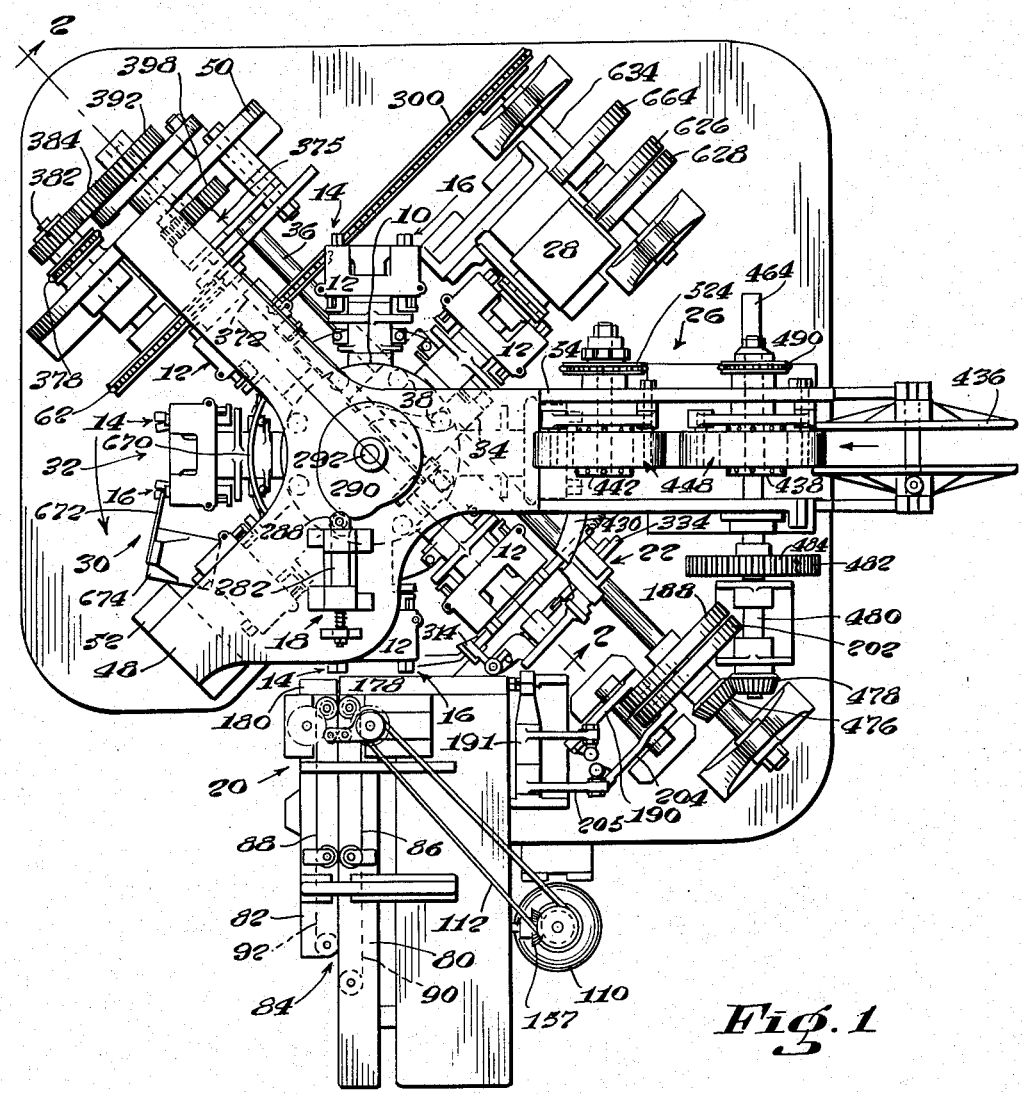

June 20, 1950     J. P. WHELAN     2,512,124
APPARATUS FOR PACKAGING SHOELACES
Filed May 11, 1948     13 Sheets-Sheet 1

INVENTOR.
James P. Whelan
BY J. Stanley Churchill
ATTORNEY

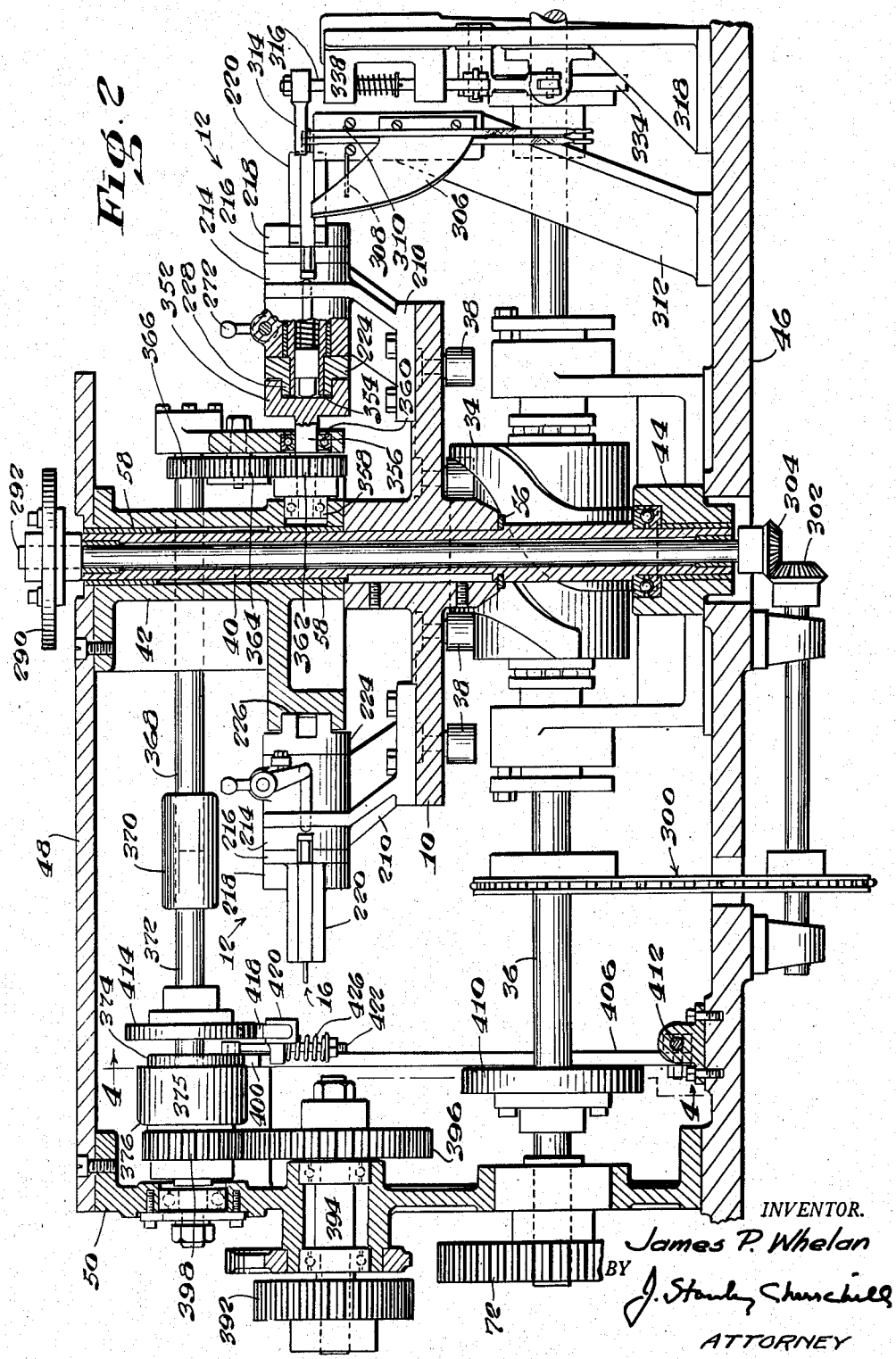

June 20, 1950 J. P. WHELAN 2,512,124
APPARATUS FOR PACKAGING SHOELACES
Filed May 11, 1948 13 Sheets-Sheet 3
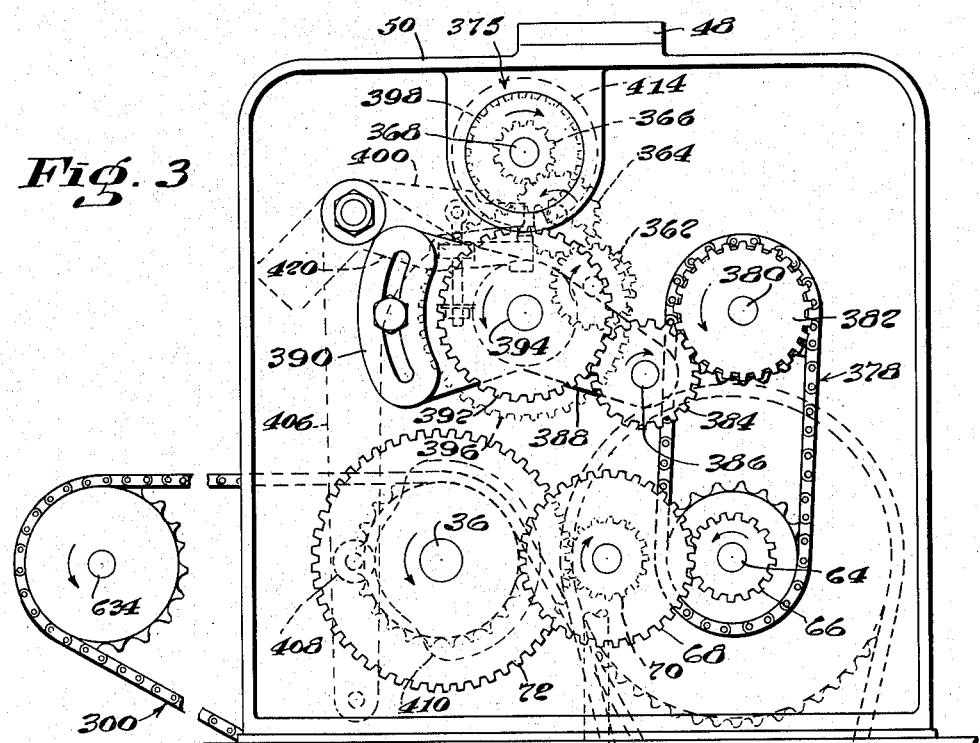
INVENTOR.
James P. Whelan
BY
J. Stanley Churchill.
ATTORNEY

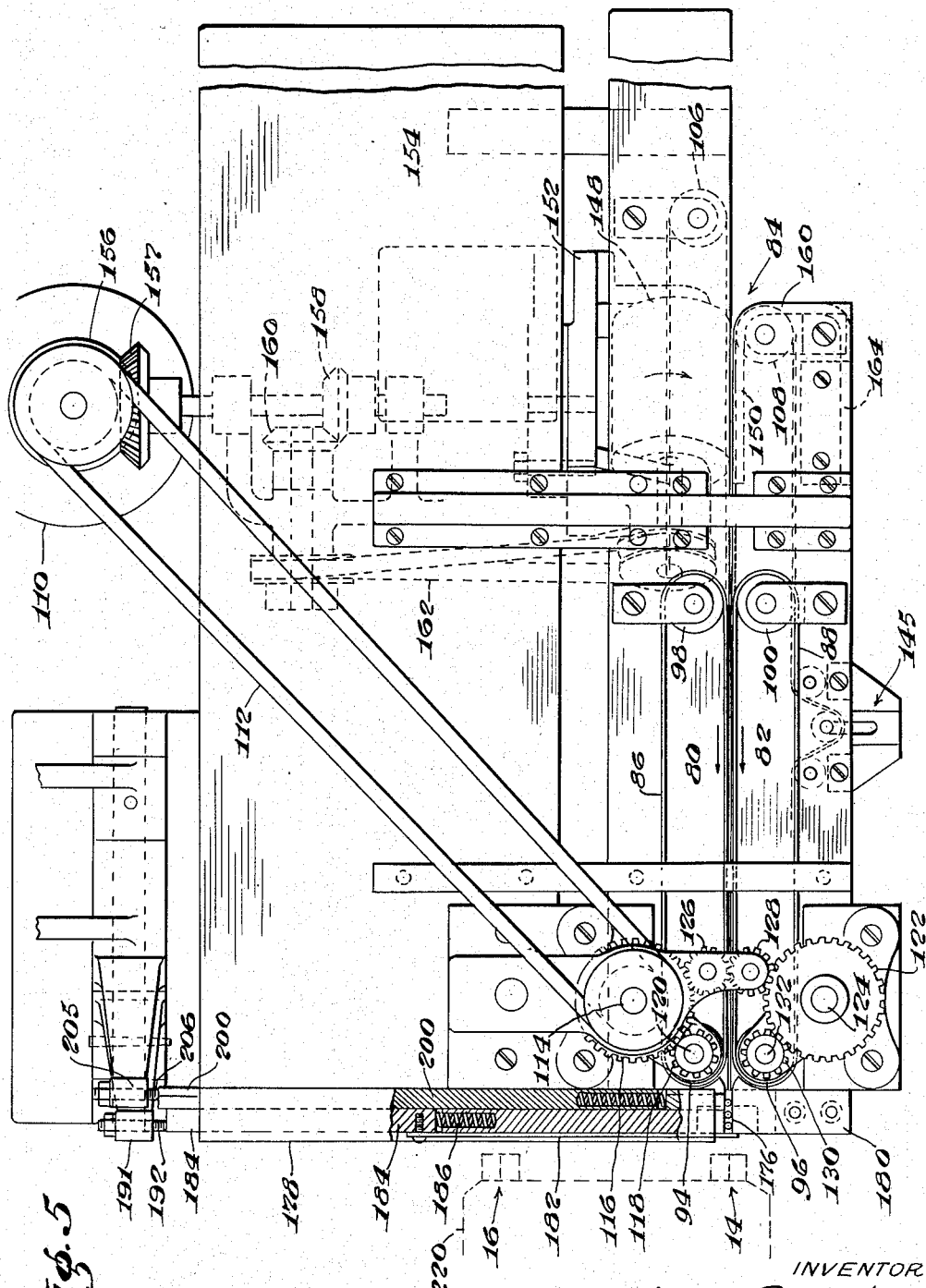

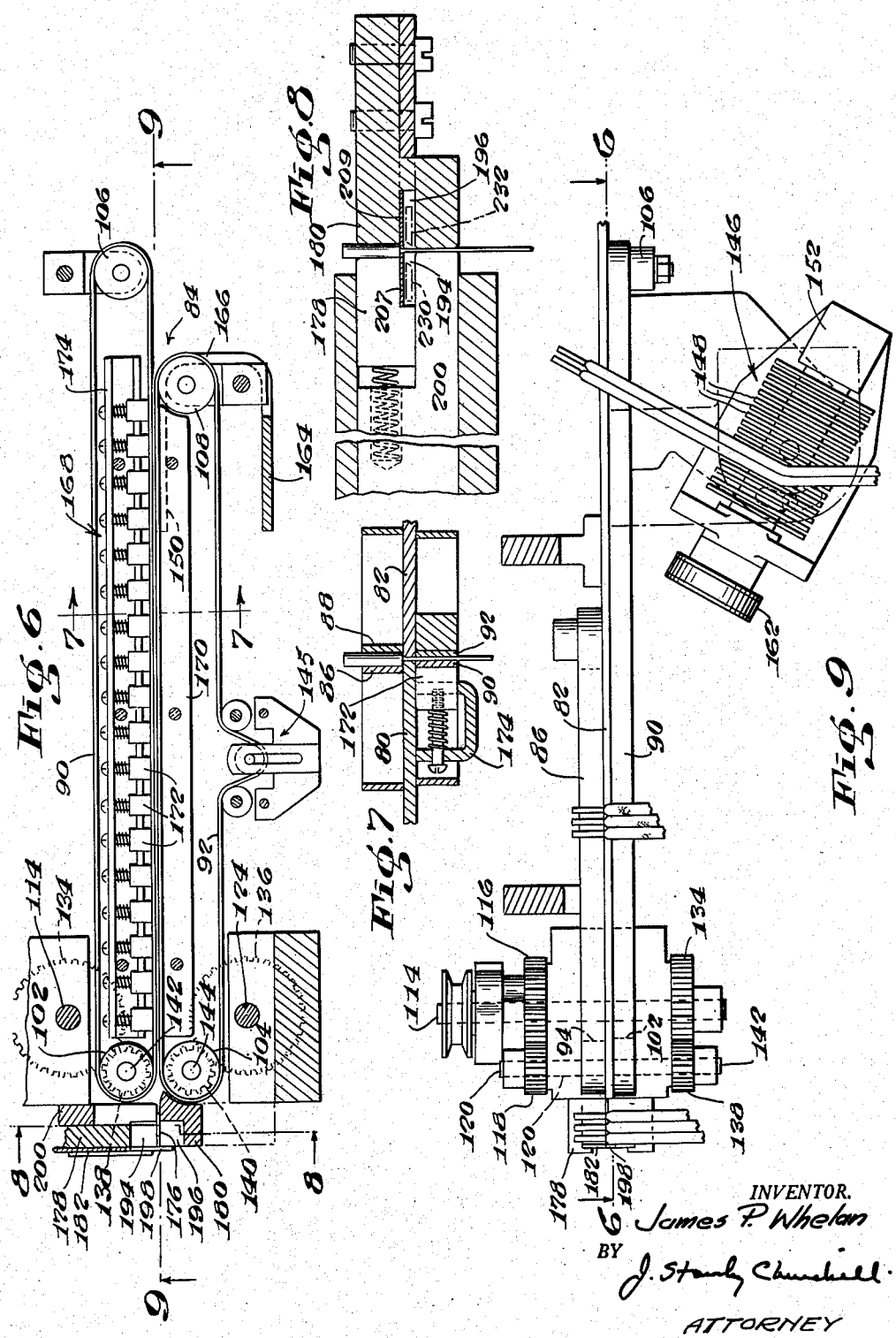

June 20, 1950        J. P. WHELAN        2,512,124
APPARATUS FOR PACKAGING SHOELACES
Filed May 11, 1948        13 Sheets-Sheet 6
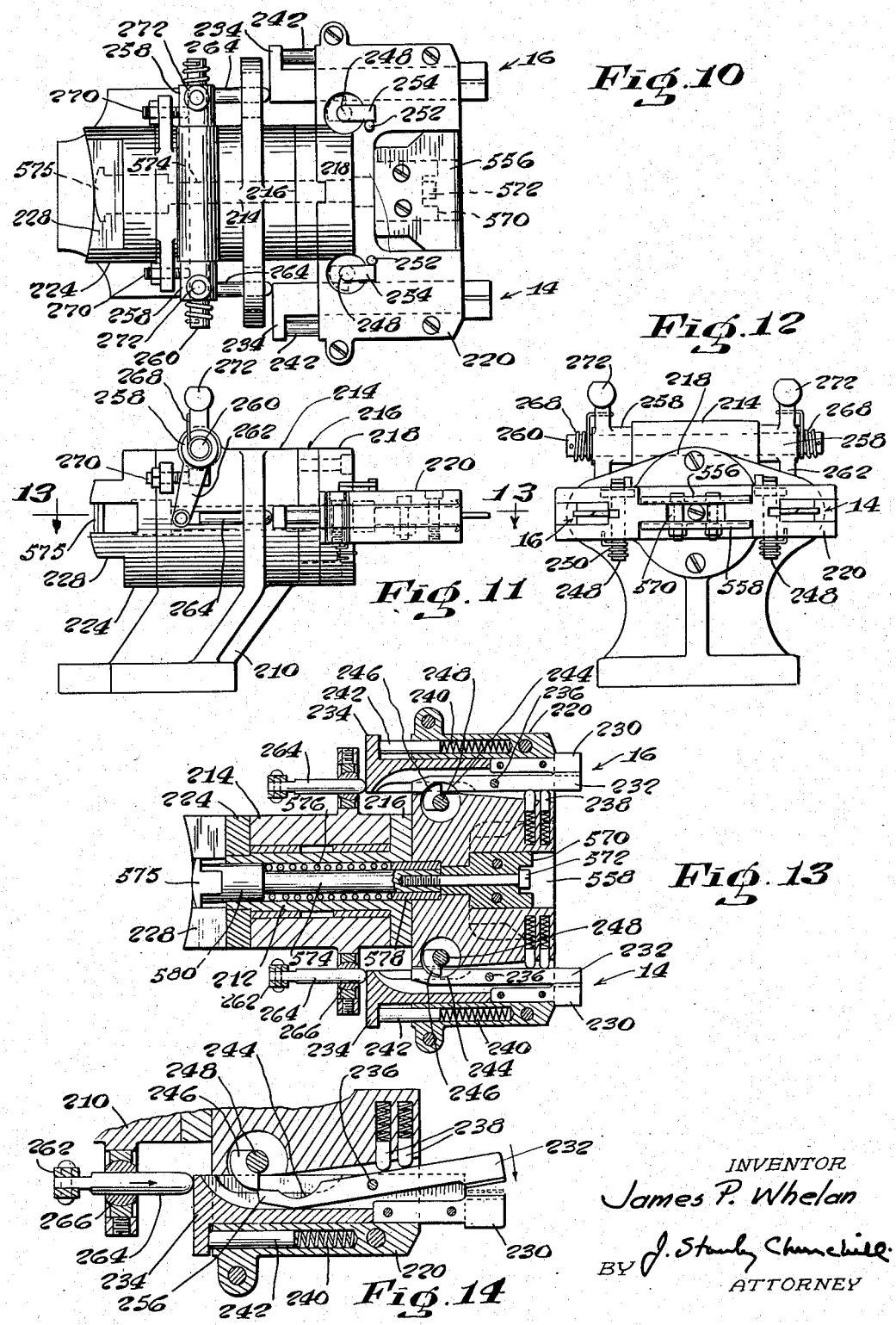

June 20, 1950 J. P. WHELAN 2,512,124
APPARATUS FOR PACKAGING SHOELACES
Filed May 11, 1948 13 Sheets-Sheet 7
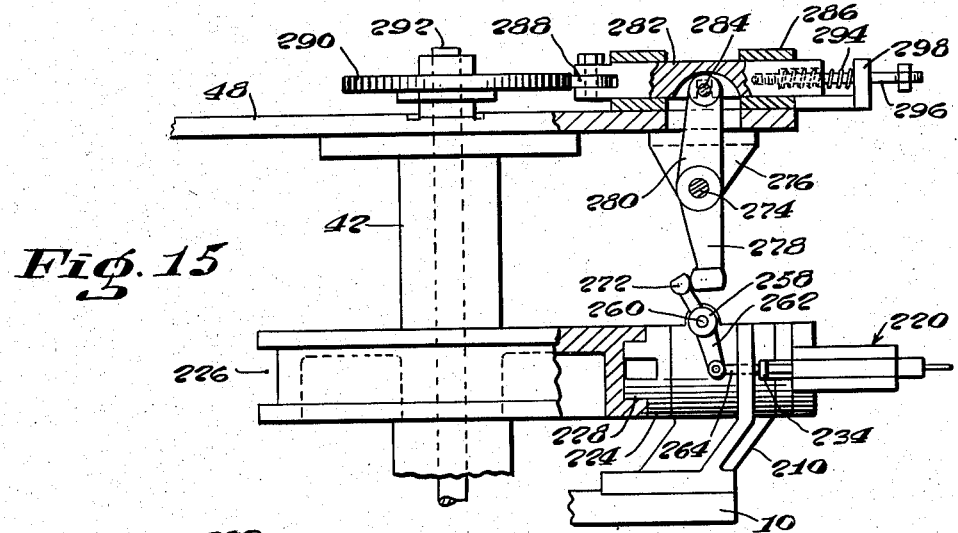
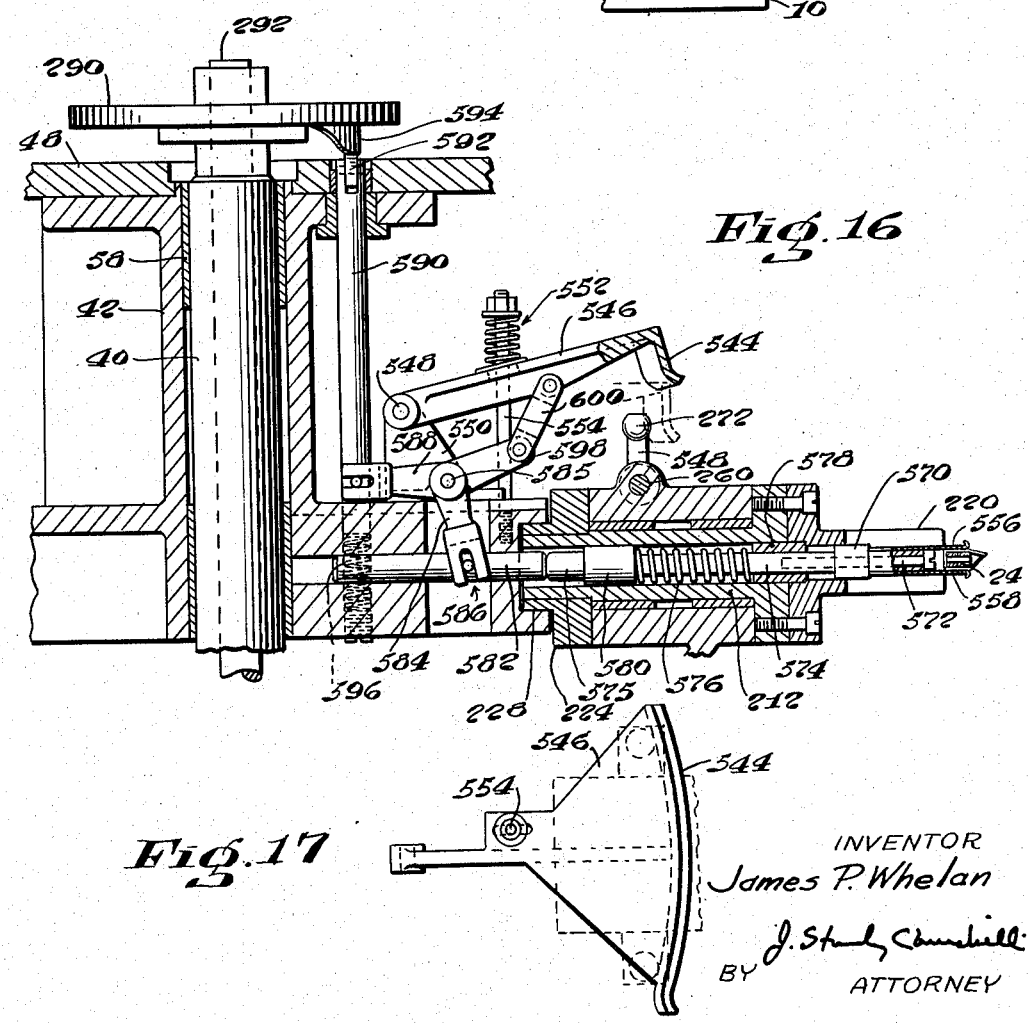
INVENTOR
James P. Whelan
BY J. Stanley Churchill
ATTORNEY June 20, 1950 J. P. WHELAN 2,512,124
APPARATUS FOR PACKAGING SHOELACES
Filed May 11, 1948 13 Sheets-Sheet 8

INVENTOR.
James P. Whelan
BY
J. Stanley Churchill
ATTORNEY

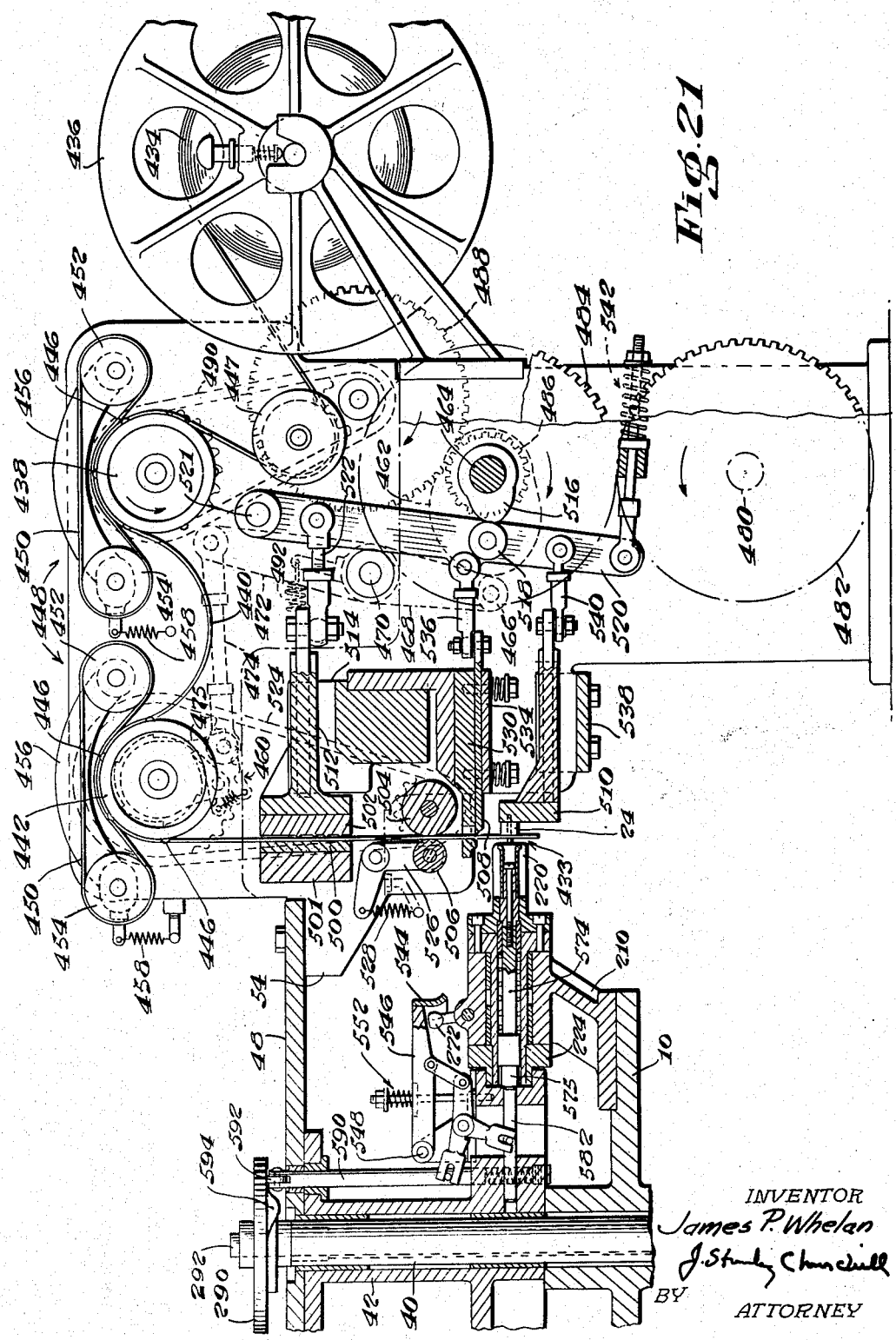

June 20, 1950 J. P. WHELAN 2,512,124
APPARATUS FOR PACKAGING SHOELACES
Filed May 11, 1948 13 Sheets-Sheet 10
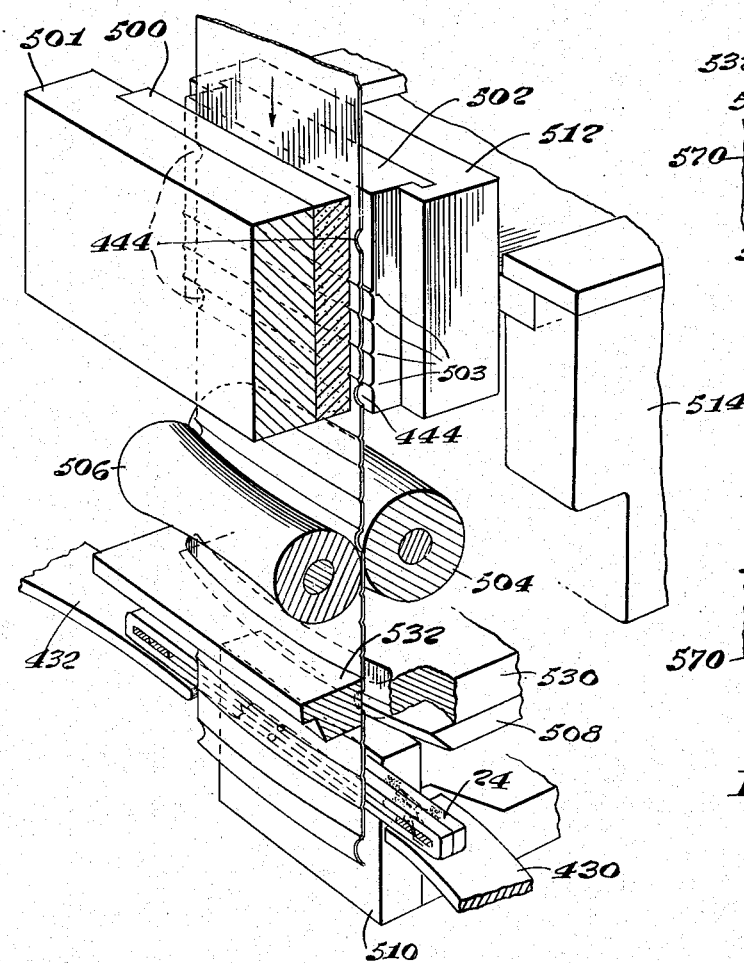
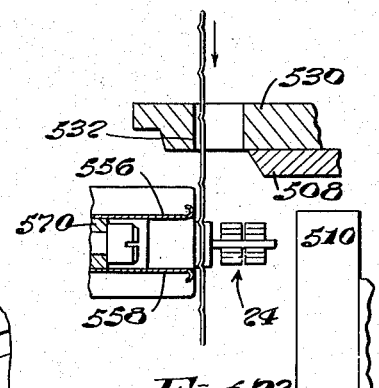
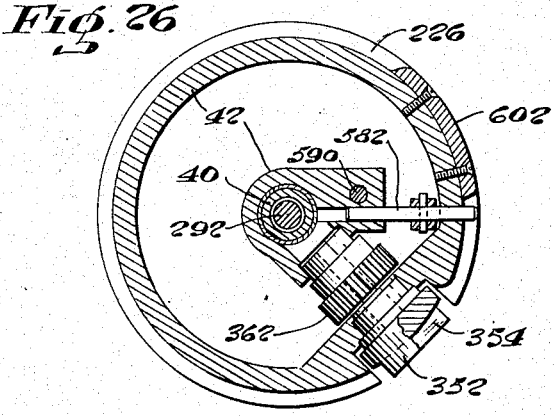
INVENTOR
James P. Whelan
J. Stanley Churchill
BY ATTORNEY June 20, 1950  J. P. WHELAN  2,512,124
APPARATUS FOR PACKAGING SHOELACES
Filed May 11, 1948  13 Sheets-Sheet 11

INVENTOR
James P. Whelan
J. Stanley Churchill
BY
ATTORNEY

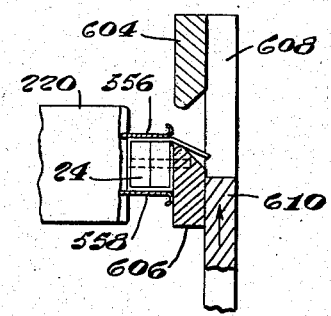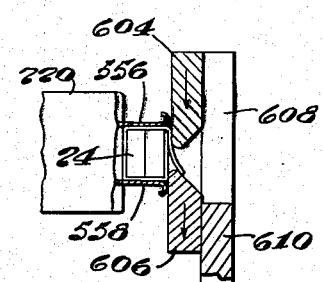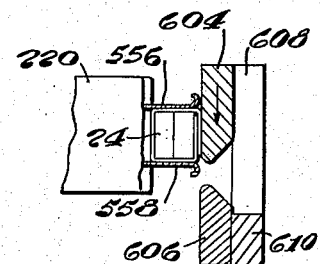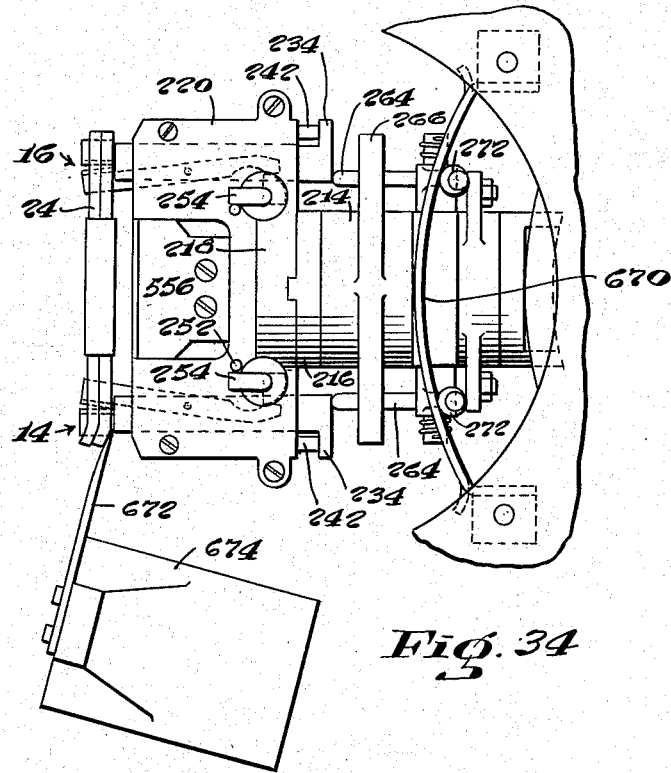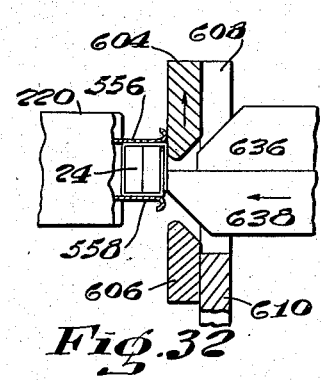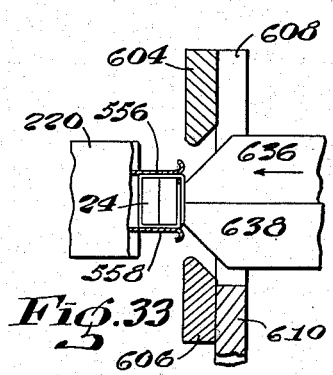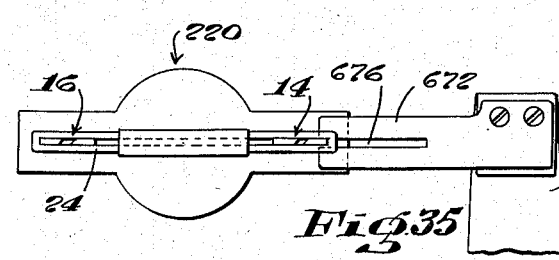

June 20, 1950 J. P. WHELAN 2,512,124
APPARATUS FOR PACKAGING SHOELACES
Filed May 11, 1948 13 Sheets-Sheet 13
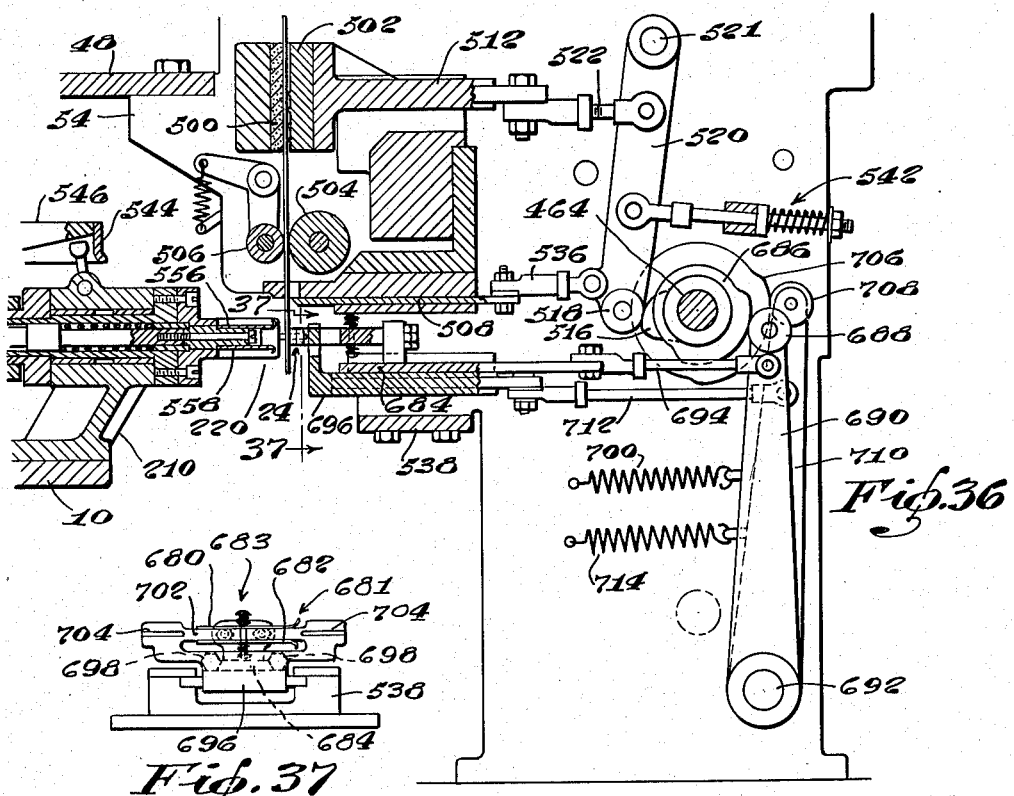
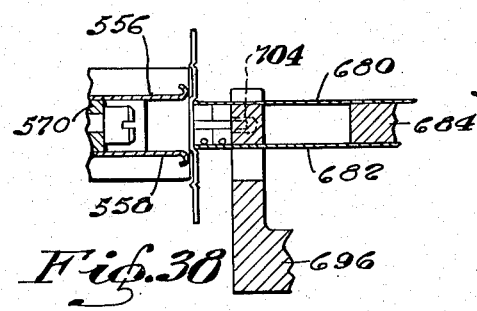
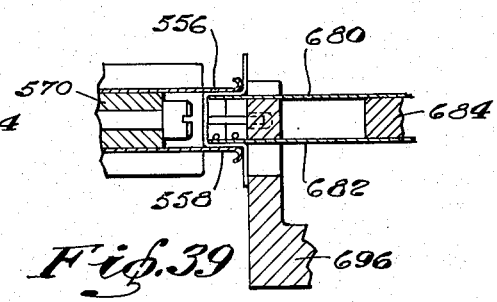
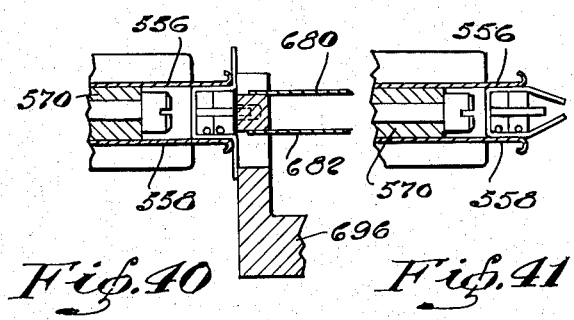
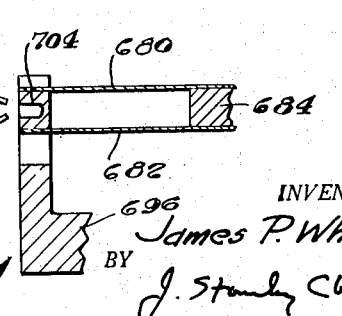
INVENTOR.
James P. Whelan
BY J. Stanley Churchill
ATTORNEY

Patented June 20, 1950

2,512,124

UNITED STATES PATENT OFFICE 2,512,124

APPARATUS FOR PACKAGING SHOELACES

James P. Whelan, Wollaston, Mass., assignor, by mesne assignments, to Heyman L. Raus, Louisville, Ky.

Application May 11, 1948, Serial No. 26,287

35 Claims. (Cl. 28—21)

This invention relates to apparatus for packaging shoe laces.

The invention has for an object to provide novel and improved apparatus for packaging shoe laces which is novel in construction and highly efficient in operation.

Another object of the invention is to provide a novel and improved apparatus for packaging shoe laces having provision for withdrawing successive pairs of laces from a supply thereof, winding the laces to form an elongated duplex coil, and applying and sealing a wrapper about the coiled laces in a novel and efficient manner.

A further object of the invention is to provide a novel and improved apparatus for packaging shoe laces which is characterized by provision for pre-creasing the wrapping material and for applying the wrapper about the laces with the pre-creased portions forming the corners whereby to produce a package substantially square in cross-section and which will retain its square shape upon subsequent handling and packing.

A still further object of the invention is to provide novel and improved lace feeding apparatus for a shoe lace packaging machine adapted to support and advance successive laces in edge to edge alignment and to present successive foremost pairs of laces into operative position to be withdrawn by lace winding mechanism.

With these objects in view, and such others as may hereinafter appear, the invention consists in the apparatus for packaging shoe laces and in the various structures, arrangements and combinations of parts hereinafter described and particularly defined in the claims at the end of this specification.

Figure 27:
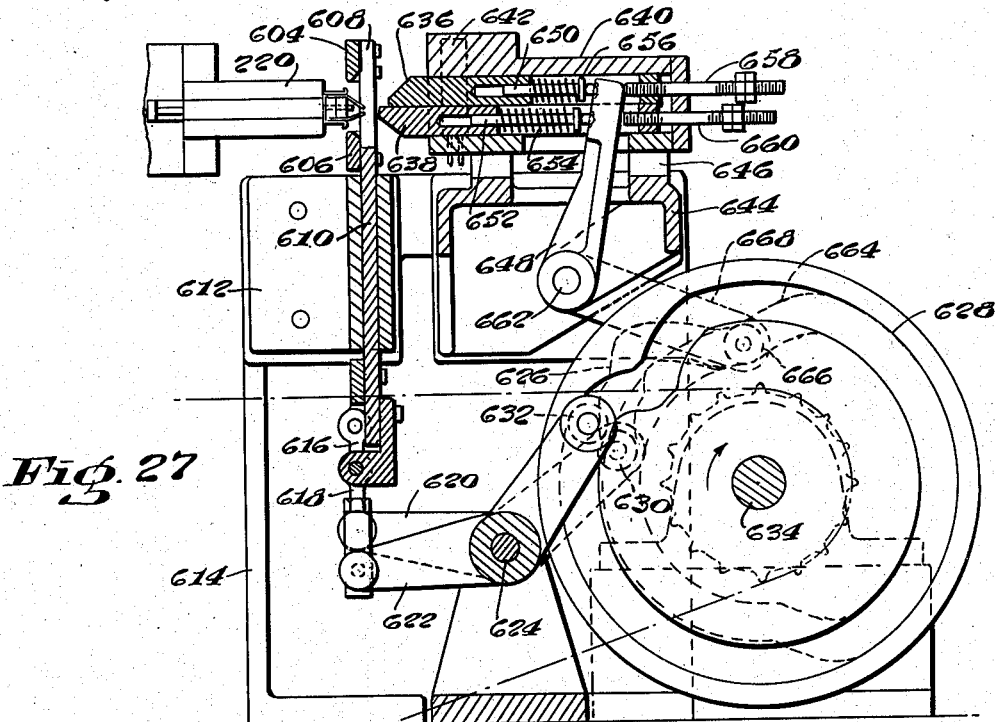
Figure 28:
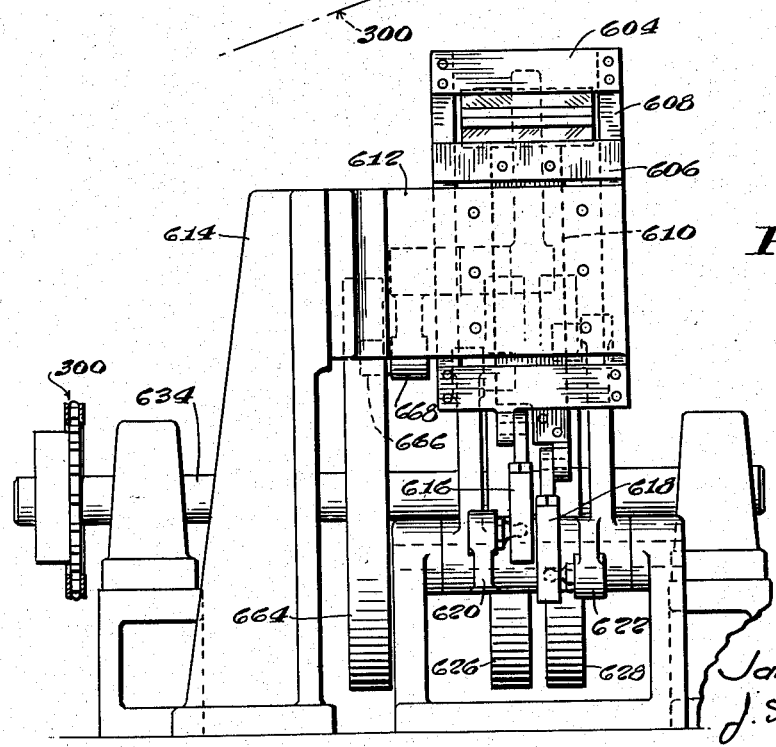

In the drawings, Fig. 1 is a plan view of a shoe lace packaging machine embodying the present invention; Fig. 2 is a cross sectional view taken on the line 2—2 of Fig. 1; Fig. 3 is a side elevation as viewed from the left of Fig. 2; Fig. 4 is a detail view in side elevation of clutch operating mechanism, forming a part of the lace winding mechanism, as viewed from the line 4—4 of Fig. 2; Fig. 5 is a plan view of the lace feeding mechanism; Fig. 6 is a plan view partly in cross section taken on the line 6—6 of Fig. 9; Fig. 7 is a cross sectional view taken on the line 7—7 of Fig. 6; Fig. 8 is a view in cross section taken on the line 8—8 of Fig. 6; Fig. 9 is a side elevation in cross section taken on the line 9—9 of Fig. 6; Figs. 10, 11 and 12 are plan, front and side elevations respectively of the shoe lace winding head; Fig. 13 is a cross sectional plan view of the winding head, the section being taken on the line 13—13 of Fig. 11; Fig. 14 is an enlarged detail view in cross section of a portion of the winding head showing the gripper jaws in open position; Fig. 15 is a view in side elevation and partly in cross section of the cam operated mechanism for extending a pair of gripper jaws at the lace receiving station; Fig. 16 is a side elevation in cross section of mechanism for operating the winding head at the wrapper applying station; Fig. 17 is a detail plan view of a portion of the mechanism shown in Fig. 16; Figs. 18 and 19 are plan and front elevations respectively of the lace winding mechanism; Fig. 20 is a detail view, partly in cross section of the winding mechanism in a different position of operation; Fig. 21 is a side elevation, partly in cross section, of the wrapper feeding and applying station; Fig. 22 is a perspective view of a portion of the wrapper feeding and severing mechanism; Figs. 23, 24 and 25 are detail views illustrating successive steps in the operation of applying a wrapper to the coiled pair of laces supported on the winding head; Fig. 26 is a plan view in cross section of a portion of the winding head track; Fig. 27 is a side elevation in cross section of the wrapper end folding the sealing mechanism; Fig. 28 is a front elevation of the mechanism shown in Fig. 27; Figs. 29 to 33 are detail views illustrating successive steps in the operation of the end folding and sealing mechanism; Fig. 34 is a plan view of the lace discharging station; Fig. 35 is a side elevation of stripping mechanism shown in Fig. 34; and Figs. 36 to 41 inclusive are views illustrating a modified form of wrapper applying mechanism to be referred to.

In general, the present invention contemplates novel apparatus for packaging shoe laces in pairs and relates particularly to a rotary type apparatus arranged to support and intermittently advance a plurality of winding heads into operative position to successive stations for performing the various packaging operations including withdrawal of a pair of laces from a supply thereof, winding the laces in the form of a duplex coil, applying a wrapper about the coiled laces while disposed on the winding element, and sealing overlapping portions of the wrapper to produce packaged pairs of laces in a rapid, efficient and economical manner. Provision is also made in the present apparatus for feeding a continuous supply of laces into operative position to be withdrawn by successive winding elements, the lace feeding mechanism being characterized by provision for supporting and advancing the laces edge to edge in a single file, and, by provision for releasing successive foremost pairs of laces in timed relation to the operation of the winding heads to receive and withdraw the foremost pair of laces from the supply. The present apparatus is also capable of handling shoe laces of various lengths, provision being made for varying the number of rotations or half rotations of the winding head to accommodate the apparatus for winding and packaging laces of different lengths.

Another feature of the present invention resides in the provision of wrapper feeding mechanism adapted to prepare and deliver a pre-creased wrapper into operative position to be wrapped about the pair of laces while supported on the winding head, the pre-creased portions of the wrapper conforming to the corners of the rectangular cross sectional configuration of the central or intermediate portion of the elongate duplex coil, whereby to provide successive wrapped packages which are uniformly substantially square in size and shape.

Referring now to the drawings, in general, the illustrated apparatus for packaging shoe laces in pairs comprises an intermittently operated rotary spider 10 having a plurality of radially extended and circumferentially spaced winding heads 12 provided with spaced extendable gripping and winding jaws 14, 16, one of which is arranged to be extended and opened at the lace receiving station, indicated generally at 18, to grip and withdraw the foremost pair of laces presented thereto by lace feeding mechanism, indicated generally at 20. In the operation of the machine, when the winding head 12 is presented to the winding station, indicated generally at 22, the pair of laces, grasped at one end between a pair of gripper jaws, are wound about the spaced pairs of jaws 14, 16 in side by side or edge to edge relation to form an elongate duplex coil 24.

In the continued operation of the machine, when the winding head is presented to the next station of operation, indicated generally at 26, provision is made for forming and applying a pre-creased wrapper about three sides of the coiled pair of laces while still supported upon the reeling or winding jaws 14, 16, the free ends of the wrapper extending beyond the remaining unwrapped side of the coil and with the pre-creased portions of the wrapper conforming substantially to the corners defining the rectangular shape of the coiled laces.

The wrapper material may and preferably will comprise a heat sealable paper of the type impregnated with or having a coating of thermoplastic material, contacting portions of which are capable of being sealed together upon the application of heat and pressure, and, at the following station of operation, indicated generally at 28, the extended ends of the wrapper are folded in overlapping relation against the remaining side of the coiled laces and sealed together to complete the wrapping operation. The completely packaged laces are subsequently stripped from the winding head by stripping mechanism, indicated generally at 30, upon intermittent movement of the winding head from the discharge station, indicated generally at 32.

As illustrated in Fig. 2, the winding heads 12 are radially mounted on the rotary spider 10, and, the latter is arranged to be intermittently rotated by a barrel cam 34 fast on a main cam shaft 36 and arranged for cooperation with circumferentially spaced rollers 38 carried by and depending from the underside of the spider 10. The spider may and preferably will be keyed to a hollow shaft or sleeve 40 mounted for rotation in an upper bracket 42 and in a lower bearing member 44, the latter being supported in the machine platen 46. The upper bracket 42 is attached to and depends from an upper supporting plate 48 which extends across the top of the machine and is supported from the platen 46 at three spaced points by brackets 50, 52, 54 as best shown in Fig. 1. The spider 10 is further supported on the hollow shaft 40 by a bearing washer 56 which rests on a shouldered portion of the hollow shaft, the lower end of the spider hub bearing against the top of the washer, as shown. Suitable bushings 58 may also be provided in the upper bracket 42 for the hollow shaft 40.

The cam shaft 36, on which the barrel cam 34 is mounted, is arranged to be driven from a drive shaft 60, see Fig. 3, through driving connections including a chain and sprocket drive 62 to an intermediate shaft 64, and through a gear train comprising spur gears 66, 68 and 70, 72, the latter being fast on the cam shaft 36. The drive shaft 60 may be driven through any usual or preferred means, such as an electric motor, not shown.

As above stated, in the operation of the machine, successive winding heads 12 intermittently moved to the receiving station 18 are arranged to withdraw successive foremost pairs of laces presented thereto by the lace feeding device 20, the laces being supported at one end adjacent the tip in a vertically depending position and in single file, edge to edge alignment. As illustrated in Fig. 5, the laces are supported and advanced between guide rails 80, 82, spaced apart a distance substantially equal to the thickness of a lacing, the space forming a guideway or track arranged to support the connected ends of the rigid and relatively larger diameter metal tips in straddled relation across adjacent edges of the upper surface of the rails, as illustrated in Fig. 7. The laces are manually introduced into the guideway at a mouth portion, indicated at 84, and are continuously advanced along the guideway by opposed endless bands comprising an upper pair of cooperating bands 86, 88 engageable with the tips of the laces extending above the guide rails, and, a lower pair of cooperating bands 90, 92 engageable with the depending portions of the laces immediately below the guide rails.

The upper and lower opposed conveying elements may comprise any suitable bands arranged in opposed relation for cooperating engagement with the laces, such as chains or belts, the illustrated bands being herein shown as belting. The upper bands 86, 88 engageable with the tips of the laces are arranged to run over driving pulleys 94, 96 and driven pulleys 98, 100 respectively, and, the lower bands 90, 92 engageable with the portions of the laces immediately below the tips are arranged to run over driving pulleys 102, 104 and driven pulleys 106, 108 respectively. The belts are arranged to be driven from a motor 110 through a belt connection 112 to a vertical shaft 114 having a gear 116 in mesh with a pinion 118 fast on a stub shaft 120 on which the drive pulley 94 is mounted. The gear 116 is connected to a similar gear 122 fast on a vertical shaft 124 on the other side of the guideway by idler gears 126, 128, and the gear 122 is in mesh with a pinion 130 fast on a stub shaft 132 on which the driving pulley 96 is mounted. Similar connections are provided for driving the lower band pulleys 102, 104, and as herein shown, the lower ends of the vertical shafts 114, 124 are provided with similar gears 134, 136 arranged to mesh with pinions 138, 140 fast on stub shafts 142, 144 respectively on which the lower band driving pulleys 102, 104 are mounted. The drive pulleys for the upper and lower conveying elements are preferably of the same diameter to effect driving of the conveying elements at the same surface speed, and, it will be observed that the axial distance between the upper stub shafts 120, 132 is slightly greater than the axial distance between the lower stub shafts 142, 144 to accommodate the difference in thickness between the tips and the laces. Suitable belt tensioning elements, indicated at 145, may also be provided.

In practice, the laces introduced into the mouth 84 of the guideway by the operator may be extended above the guiderails in various degrees of length and the depending portions may be more or less loosely tangled together, and, as herein shown, provision is made for pulling the laces down in the guideway to dispose the lower ends of the tips in straddling engagement with the adjacent upper surfaces of the guide rails 80, 82 in horizontal alignment, and, to simultaneously comb the laces out into separate individual strands. The lace pull down and combing device may comprise a rotary brush 146 preferably made up from a plurality of spaced yieldable discs 148, such as rubber discs, arranged on one side of the guideway, and cooperating with a smooth surfaced plate 150 arranged on the other side of the guideway. As herein shown, the brush 146 is supported at an upwardly inclined angle in the direction of travel of the laces in a bracket 152 secured to the underside of the platen 154 and is arranged to be rotated through connections from the motor 110, including bevel gears 156, 157, bevel gears 158, 160, and a belt connection 162 to the rotary brush 146. The smooth surfaced backing plate 150, as herein shown, comprises one leg of a V-shaped bracket 164 secured to the underside of the outer guide rail 82, the connecting portion 166 of the V-shaped bracket being curved to conform to the curved mouth portion 84 of the guideway.

During the progress of the laces between the conveying belts, provision is made for applying pressure against the portions of the belts engageable with the laces below the guiderails 80, 82, and, as herein shown, a yieldable pressure applying unit 168 engageable with the inner surface of the belt 80 is arranged to cooperate with a stationary pressure member 170 disposed against the inner surface of the belt 82. As illustrated in detail in Fig. 7, the yieldable pressure applying unit 168 comprises a plurality of individual spring pressed pressure blocks 172 slidingly supported in a V-shaped bracket 174 attached to the underside of the guide rail 80. The individual pressure members assure uniform pressure against the laces being advanced between the belts at any point along the run.

From the description thus far, it will be seen that in the operation of the machine, the laces are continuously urged forward between the guiderails 80, 82 by the continuously moving conveying bands toward the delivery or releasing end of the feeding device 20, and, as herein shown, the delivery end of the feeding device is designed to permit extension of the winding head jaws 14 or 16 into the delivery end thereof to grasp and withdraw the foremost pair of laces. When the laces leave the conveying bands at the forward end of the guideway, they are received in a passageway 176 formed between opposed block members 178, 180, the passageway 176 forming a continuation of the guideway formed between the rails 80, 82. As shown in Fig. 6 the foremost lacing is retained in the passageway by an elongated cam-operated slide gate 182 mounted for reciprocation in the block member 178. The slide gate is secured to a slide member 184 normally urged by a spring 186 in a direction to retract or open the gate, and, is arranged to be extended into its closed or lace retaining position by a cam 188 fast on the main cam shaft 36, see Fig. 1, through connections including a cam lever 190, and bell crank 191, the latter having a pin 192 engageable with the outer end of the slide member 184. The opposed block members 178, 180 are provided with similar opposed cut-out portions or slots 194, 196 at a point corresponding to a position immediately below the tip portion of the vertically depending laces and of a width such as to permit the open jaws of the winding head to enter and close upon the foremost pair of laces. The forward end of the slide gate 182 may likewise be provided with a slotted portion 198 coincident with the slots 194, 196 to provide clearance for the jaws when the gate is being moved into and from its closed position. The cam 188 is arranged to operate the gate in timed relation to the operation of the winding head so as to effect release of the foremost pair of laces when the gripper jaws are extended into operative position to receive the laces.

It will be understood that when the line of laces is held stationary in the guideway by the slide gate 182, the continuously operated conveying bands are arranged to slip on the laces, and thereafter, when the foremost laces are withdrawn, the entire line of laces may move forward to present the next succeeding pair of laces into operative position to be withdrawn by the next winding head presented to the lace receiving station. In the illustrated embodiment of the invention, provision is made for detaining the forward movement of the line until the foremost pair of laces is entirely withdrawn and the slide gate 182 is moved forward into its closed position. As herein shown, the detainer member comprises an elongated slide 200, spring pressed in a direction to permit advancement of the laces and arranged to be moved into detaining position against the second foremost pair of laces by a cam 202 fast on the cam shaft 36 and through connections including a cam lever 204 and bell crank 205 the latter having a pin 206 engageable with the outer end of the detaining slide member 200. The detaining member presses the laces against the opposite side of the guideway defined by the block 180. As shown in Fig. 8, the laces are supported in the passageway 176 by thin plate members 207, 209, secured to the upper walls of the cut out portions 194, 196 respectively, the lower ends of the tips straddling across the edges of the plates. Thus in the operation of the machine thus far described, the laces are continuously urged forward into lace releasing position to be withdrawn by the gripper jaws of successive winding heads presented thereto.

Referring now particularly to Figs. 10 to 14, each winding head 12 is mounted for rotation in a supporting bracket 210 and includes a sleeve portion 212 rotatably mounted in the hub 214 of the bracket and having a circular flange 216 coextensive with the hub 214 and to which a flanged portion 218 of the winding arm 220 is attached. As herein shown, the winding arm 220 is generally rectangular in shape and extends at right angles to the axis of rotation, the winding jaws 14, 16 being mounted for extension and retraction at each end of the arm 220. The winding arm is maintained in a horizontal position during its progress through the machine by a guide member 224 secured to the inner end of the rotary sleeve 212 and which is arranged to cooperate with a grooved track 226 formed in the stationary bracket 42. The guide member 224 is generally cylindrical in form having opposed cut out portions forming a tongue 228 arranged to fit in the groove or track 226. The guide member 224 also forms the driven member of a clutch, the driving member of which forms a continuation of the track at the winding station 22 as will be hereinafter described.

As best shown in Figs. 13 and 14, each pair of gripper jaws indicated at 14, 16 is slidingly mounted in the winding arm 220, and, each pair of jaws includes a relatively stationary jaw 230 and a movable jaw 232 carried by a slide member 234. The movable jaw 232 is pivotally mounted at 236 in the member 234 and is normally urged into gripping engagement with the stationary jaw by spring pressed pins 238 carried by the winding arm. The gripper jaws are normally maintained in a retracted and closed position, as shown in Fig. 13 by a spring 240 carried by the winding arm and engageable with a pin 242 extended from the inner end of the side member 234.

The movable jaw 232 is designed to be rocked to open the jaws during extension of the slide member 234 in the winding arm and to close or snap shut when the limit of extension is reached and, as herein shown, the inner end of the movable jaw is provided with an arcuate cut out portion 244 arranged to cooperate with a segmental cam member 246 mounted on a pin 248 rockingly mounted in the winding arm. The pin 248 is provided at one end with a coil spring 250 tending to rock the pin in a counterclockwise direction viewing Fig. 14, and is limited in its rocking movement in this direction by a stop member 252 arranged in the path of an arm 254 carried by the other end of the pin. Thus, the segmental cam member, 246, formed substantially in the shape of a quadrant, is maintained stationary in a position of coincidence with the arcuate cut out portion 244 when the jaws are in their retracted position. When the jaws are extended the arcuate portion 244 rides over the stationary segment to effect opening of the jaw and when the tail end 256 of the movable jaw rides off the end of the segment, the jaw will snap shut. Thereafter, during retraction of the jaws, the tail end 256 will engage the end of the segment cam and effect rotation thereof against the urging of the spring 250, in a clockwise direction viewing Fig. 14, until the jaw arrives at its fully retracted position whereupon the segment cam may snap back into normal position into the arcuate cut out portion 244.

The jaws are arranged to be extended through connections including a bell crank 258 pivotally mounted on a pin 260 fast in the hub portion 214, one arm 262 of the bell crank being connected to a pin 264 slidingly mounted in a rocker bearing 266 supported in a flanged portion of the bracket 210, the slidingly mounted pin being engageable with the inner end of the slide member 234. The bell crank is urged in a clockwise direction, viewing Fig. 11, by a coil spring 268, being limited in its rocking movement in this direction by a stop screw 270. The upwardly extended arm of the bell crank is provided with a ball-shaped end 272 in position to be engaged by a cam operated member for effecting extension of the jaws at the stations required.

As herein illustrated, each pair of jaws 14, 16 is identical in structure and mode of operation, and in the operation of the machine either one or the other pair of jaws may be in alignment with the line of laces presented thereto by the feeding device 20 at the lace receiving station 18, depending upon the change in relative position as effected by rotation thereof at the winding station during previous operation of the machine. The cam operated mechanism for extending the pair of jaws in alignment with the line of laces at the lace receiving station 18, to effect opening and closing of the jaws and withdrawal of the foremost pair of laces in the manner above described, is illustrated in Fig. 15, and, as therein shown, includes a two-armed lever pivotally mounted at 274 in a bracket 276 secured to the underside of the upper supporting plate 48. One arm 278 of the lever is provided with a rounded end arranged to cooperate with the ball-shaped end 272 of the bell crank and the second arm 280 of the two-armed lever is operatively connected to a cam operated slide member 282 by a pin and slot connection 284, as clearly shown in Fig. 15. The slide member 282 is supported for reciprocation in a guide 286 mounted on the plate 48 and is provided at its inner end with a cam roll 288 arranged to cooperate with a cam 290 fast on the upper end of a vertical shaft 292 extended through and journalled in the hollow shaft 40, as shown in Fig. 2. The slide member 282 is urged to the left, viewing Fig. 15, by a compression spring 294 coiled about a guide pin 296 and interposed between the outer end of the slide member and an upstanding lug 298 of the guide member 286. The central cam shaft 292 is arranged to be rotated from the main cam shaft 36 through connections including a chain and sprocket drive 300 and bevel gears 302, 304, as shown in Fig. 2.

From the description thus far it will be observed that a pair of laces is withdrawn from the lace feeding mechanism by the winding head 12 with the winding arm 220 disposed in a horizontal position and that the laces are gripped by the trailing pair of jaws, relative to the direction of movement of the winding heads and at a point on the laces a short distance below the lower end of the tip at the upper end of the laces, the remaining portions of the laces depending vertically from the gripper jaws.

Referring now particularly to Figs. 18 and 19, during the movement of the winding head from the lace receiving station 18 to the winding station 22, the winding arm 220 is maintained in a horizontal position by the guide member 224 riding in the circular groove 226, and during such movement the laces held in the trailing gripper jaws are separated by an arcuate separating plate 306 disposed in the path of the oncoming laces and are guided into lace winding position by guide rods 308, 310 disposed on each side of the plate 306. The separating plate and the guide rods are secured to and extended from a bracket 312 disposed at the winding station. Provision is made for tensioning the laces and for flattening or straigtening out any curls or wrinkles in the laces during the winding operation, and as herein shown, when the winding head is moved into winding position, the trailing laces pass over the top of the bracket 312 and under a cam operated tensioning arm 314 arranged to be raised during the travel of the winding head to permit the gripper jaws to pass thereunder, and to be lowered into cooperating and yielding engagement with the laces and the upper end of the bracket 312. As illustrated in Fig. 19, the tensioning arm 314 is mounted on the upper end of a pin 316 mounted for vertical reciprocation in a bracket 318 and is connected at its lower end by a pin and slot connection 320 to one arm 322 of a bell crank pivotally mounted at 324. The second arm 326 of the bell crank is also joined by a pin and slot connection 328 to a link 330 slidably mounted in a bearing member 331. The other end of the link 320 carries a cam roll 332 for cooperation with a cam 334 fast on the cam shaft 36. A compression spring 336 coiled about the reciprocal pin 316 and interposed between a through pin 337 and the underside of the bracket arm 338 is arranged to urge the pin in a direction to lower the tensioning arm into operative engagement with the laces and to urge the linkage in a direction to maintain the cam roll against the cam. As shown in Fig. 18, the tensioning arm 314 is provided with a stop arm 340 arranged to cooperate with a pin 342 to prevent rotation of the arm under the influence of the laces being drawn along under the arm during the winding operation.

As herein shown, the laces thus gripped at one end and maintained under tension are wound about the spaced jaws 14, 16 upon rotation of the winding head in a counterclockwise direction, viewing Fig. 19, and are continuously maintained in a taut condition to form a tightly wound and uniform coil by engagement with a yieldable strap or belt 344 pivotally connected at 346 to the forward end of the tensioning bracket 312, the upper surface of the strap being coextensive with the upper surface of the bracket. The strap 344 extends horizontally across the width of the winding arm 220 and over an idler roll 348 supported from the bracket 318 and is connected at its other end by an extension spring 350 attached to the machine platen. Thus in the operation of the device, the strap 344 will yield as shown in Fig. 20 and follow along in continuous engagement with the laces on the winding arm in its different positions during rotation.

Referring now to Figs. 2, 3 and 4, the mechanism for effecting rotation of the winding head 12 to perform the winding operation includes a driving member 352 arranged to cooperate with the driven member 224 secured to the inner end of the wing head, the driving member 352 having a grooved portion 354 of the same size as the grooved track 226 and normally disposed in a horizontal position to form a continuation of the track and to bridge a gap in the track at the winding station, as shown in Fig. 26. The driving member 352 is formed on the end of a short shaft 356 journalled in bearings 358, 360 and is arranged to be rotated through a train of gears 362, 364, 366, the latter being fast on a drive shaft 368 which is connected by a coupling 370 to a shaft 372 coextensive therewith. The latter is operatively connected to the driven member 374 of a one revolution clutch unit indicated generally at 375. The driving member 376 of the clutch is arranged to be continuously driven from the intermediate shaft 64 through connections including a chain and sprocket drive 378 to a shaft 380, and a gear 382 fast on the shaft 380 and arranged to mesh with an interchangeable idler gear 384 mounted on a stud 386 carried by an arm 388 of an adjustable bracket 390, as clearly shown in Fig. 3. The idler gear 384 is arranged to mesh with a second interchangeable gear 392 fast on a shaft 394 journaled in the side frame bracket 50, the other end of the shaft 394 having a gear 396 arranged to mesh with a gear 398 secured to the driving member 376 of the clutch 375.

As best shown in Fig. 4, the clutch 375 is arranged to be controlled by a cam operated latch arm 400 engageable with a notched portion 402 of the driven member 374 of the clutch to effect disengagement thereof. The latch arm forms one arm of a bell crank pivotally mounted at 404, the second arm 406 having a cam roll 408 arranged to cooperate with a cam 410 fast on the cam shaft 36. A spring pressed rod 412 connected to the lower end of the arm 406 is arranged to hold the roll 408 against its cam and to urge the latch arm into clutch disengaging position, the cam 410 operating to rock the latch out of the way to permit engagement of the clutch and rotation of the winding head when the latter comes to rest at the winding station. The shaft 372 connected to the driven member 374 of the clutch is provided with an indexing disc 414 having a notched portion 416 arranged to be engaged by a tooth 418 carried in the end of a lever 420, operatively connected to the latch arm 400. As herein shown, the lever 420 is yieldingly connected to the arm 400 by a rod 422 slidingly mounted in a lug 424 extended from the lever 420, and a coil spring 426 connected to the extended end of the rod is arranged to yieldingly urge the lever 420 upwardly to effect engagement of the tooth 418 in the notch portion 416 immediately after the latch arm 400 is operated to effect disengagement of the clutch. A stop screw 428 carried by the arm 400 is arranged to engage the indexing lever 420 when the latch arm is rocked in a clockwise direction, viewing Fig. 4, to effect positive disengagement of the tooth 418 from the indexing disc at the start of the winding operation. The indexing disc 414 assures that the winding head will come to rest in a horizontal position and, with the guide member 224 of the winding head in alignment with the track 226 to assure maintenance of the winding head in a horizontal position during subsequent movement thereof through the machine.

As above stated, the winding mechanism is arranged to be rotated a predetermined number of turns or half turns to accommodate the particular length of shoe laces being packaged and, as herein shown, the rotations of the one revolution clutch 375 are geared down two to one through the gear train 362, 364, 366 to effect half revolutions of the winding head 12 for each revolution of the clutch and, the speed, or number of revolutions of the clutch 375 per cycle of operation may be changed to alter the revolutions per cycle by changing the proportions of the drive gears 384, 392 when laces of a different length are to be wound.

From the description thus far, it will be observed that the pair of laces gripped at one end by the grippers 14 or 16 immediately below the tips are wound the requisite number of revolutions or half revolutions in a counter-clockwise direction, viewing Fig. 19, to form a completely wound elongate duplex coil about the two gripper jaws 14, 16, the tip ends adjacent the gripper jaws being laid down flat in alingment with the adjacent coils. In practice, the trailing ends of the laces are arranged to extend rearwardly from the forward end of the winding head and on the under side of the coil, the trailing ends being supported in contiguous engagement with the underside of the coil at the winding station by the yieldable strap 344. Thereafter, during subsequent movement of the winding head to the wrapper forming and applying station 26, the trailing ends of the laces are maintained in engagement with the underside of the coil by a yieldably mounted plate 430 extending from the winding station to the wrapping station as shown in Figs. 18 and 19, and by a second and similar plate 432 disposed on the other side of the wrapping station so that when the winding head comes to rest at the wrapper applying station, the trailing ends of the laces will be disposed in position to be engaged under the wrapper, as illustrated in Fig. 22.

At the wrapper applying station 26, provision is made for simultaneously extending both pairs of jaws 14, 16 a short distance to provide a space 433 between the inner side of the coil and the front face of the winding arm 220, and, in the operation of the apparatus, a pre-creased wrapper is fed downwardly into the space and behind the coiled laces to dispose the wrapper in operative position to be severed and folded about the central portion of the elongated coil. As illustrated in Fig. 21, the wrapper material may be supplied in a roll 434 mounted on a reel 436 and is arranged to be continuously unwound from the reel by an unwinding roller 438 to form a supply of unwound material in the form of a loop 440, and to be intermittently advanced a predetermined length each cycle of operation by a roller 442 engageable with the other end of the loop. As herein shown, the web of wrapper forming material is formed with a series of equally spaced indexing notches 444 along its longitudinal edges arranged to cooperate with pins or teeth 446 formed on the rollers 438, 442. The wrapper material extends from the supply roll 434 under an idler roll 447 and thence over the rollers 438, 442 and, as herein shown, the web is maintained in operative engagement with the rollers by similar yieldingly mounted belt units 448 each comprising an endless belt 450 extending over pulleys 452, 454 rotatably supported in a bracket 456 pivoted at one end and yieldingly maintained in operative engagement with its roller by a spring 458.

The feed roller 442 is arranged to be intermittently rotated to advance the wrapper material a predetermined length each cycle of operation by a pawl and ratchet drive, indicated at 460, and through connections from a cam 462 fast on a cam shaft 464 and arranged to cooperate with a cam roll 466 carried by one arm 468 of a two-armed lever pivotally mounted at 470. The second arm 472 of the two-armed lever is connected by a link 474 to the rockingly mounted pawl arm 475 of the pawl and ratchet drive 460. The cam shaft 464 is arranged to be rotated from the main cam shaft 36 through connections including bevel gears 476, 478 to an intermediate shaft 480, see Fig. 1, and through gears 482, 484 to the cam shaft 464, as shown in Fig. 21. The unwinding roller 438 is arranged to be continuously rotated from the cam shaft 464 through connections including gears 486, 488 and a chain and sprocket drive 490, as clearly shown in Fig. 21. The two-armed cam lever 468, 472 is urged in a direction to hold the roll 466 against the cam by a spring 492.

After leaving the intermittently operated feed roller 442 the web extends downwardly first between a pair of creasing dies comprising a stationary die 500 and a movable die 502, then between web arching rollers comprising a convexly curved driven roller 504 and a cooperating concavely shaped idler roller 506. The web then extends past a cutter 508 and down behind the rear face of the extended coil which is at this time supported with its front face against a backing plate 510. As best shown in Fig. 22, the stationary die 500 may comprise a yieldable material such as rubber attached to a bar 501 and the movable die 502 provided with four V-shaped horizontally spaced ridges 503 is connected to a slide member 512 reciprocally mounted in a bracket 514. The slide member 512 is arranged to be reciprocated to effect creasing the web during the idle period of the web by a cam 516 fast on the cam shaft 464 and connections including a cooperating cam roll 518 carried by a lever 520 pivotally mounted at 521, and a link 522 connecting the lever to the slide member 512.

In the operation of the web feeding mechanism, creasing of the web as above described will tend to make the web curl up, and, in order to counteract this tendency and to maintain control of the web during subsequent downward advancement, the web is passed between the arching rollers 504, 506 arranged to provide a longitudinal bend or curve in the web to maintain the same in a relatively rigid vertical condition as it passes down into operative position to the cutter 508 and to the coil to be wrapped. The roller 504 is arranged to be driven by a chain and sprocket drive 524 from the intermittently driven roller 442, as shown in Fig. 21, and the idler roll 506 is carried by one arm of a bell crank 526 having a spring 528 attached to its other arm arranged to yieldingly urge the roller into cooperating engagement with the web and the driven roller 504.

The cutter blade 508 is slidingly mounted in a bracket 530 and is arranged to cooperate with a stationary cutting edge 532 formed in the bracket 530, the blade being yieldingly maintained against the underside of the bracket by spring pressed gibs 534. The blade is arranged to be reciprocated to effect the wrapper severing operation simultaneously with the creasing operation by a link connection 536 to the cam lever 520. The backing plate 510 is slidingly mounted in a bracket 538 and is arranged to be moved to push the duplex coil back on the jaws 14, 16 and against the front face of the winding head with the severed and pre-creased wrapper interposed therebetween, by a link connection 540 to the lever 520. Thus, in operation, the creasing, severing and pushing operations take place simultaneously when actuated by the cam 516. The cam roll 518 is maintained in operative engagement with its cam 516 by a spring and rod connection 542, as illustrated in Fig. 21.

Referring now particularly to Figs. 16 and 21, the jaws 14, 16 are arranged to be extended in the winding head to provide the space 433 between the front face of the winding arm and the adjacent face of the lace by engagement of the ball-shaped ends 272 of the pivotally mounted bell crank 258 with a curved rail 544 disposed in the path thereof as the winding head is being moved into the wrapping station, so that when the winding head comes to rest at the wrapping station the wound laces are extended to permit the wrapper to be fed downwardly behind the laces. The curved rail 544 is formed integrally with a lever 546 pivotally mounted at 548 in a bracket 550 attached to the supporting bracket 42, and is normally yieldingly maintained in a position to be engaged by the bell crank 548 of the winding head, as shown in Fig. 21, by a coil spring 552 supported on the upper end of an upstanding rod 554 secured in the bracket 42. As herein shown, the lever 546 is also connected to linkage arranged to rock the lever upwardly to permit the jaws 14, 16 to return to normal position with the rear face of the laces against the front face of the winding arm, as shown in Fig. 16, and in readiness for the wrapper applying operation, which will now be described.

In the operation of the machine thus far described, when the pre-creased wrapper web is advanced into operative position to be applied to the laces, the endmost wrapper is severed from the web and the laces are pushed back into engagement with the front face of the winding arm, the successive steps being illustrated in Figs. 23 and 24 with the severed wrapper interposed therebetween and the two inner creased portions of the wrapper in substantial alignment with the adjacent corner edges of the laces. At this time, and, while thus supported provision is made for folding the wrapper about three sides of the laces, and, as herein shown, the wrapper folding mechanism comprises a folding unit having upper and lower folding plates 556, 558 secured to a slide member 570 reciprocally mounted in the winding head and arranged to be extended therefrom to perform the folding operation. As shown in Figs. 24 and 25, the forward ends of the folding plates 556, 558 are curved outwardly and the inner faces of the plates together with the front face of the slide member 570 form a generally rectangular socket arranged to embrace the wrapper and fold it about three sides of the duplex coil while the backing member 510 is held against the forward face of the laces, the extended ends of the wrapper being caused to assume an outwardly extended position at this time, as shown in dotted lines in Fig. 25. Immediately thereafter, when the backing member 510 is retracted, the extended ends of the wrapper assume the position shown in full lines in Fig. 25 by virtue of the precreased portions adjacent the rear corner edges of the laces, the extended ends thus disposed being in readiness to be folded in overlapping relation and sealed against the rear or outer face of the laces at the succeeding station of operation.

Referring now to Figs. 13 and 21, the reciprocally mounted folding plate unit is secured by bolts 572 to a central rod 574 slidingly mounted in the rotary sleeve 212 of the winding head and is normally maintained in a retracted position therein by a spring 576 coiled about the rod and interposed between a bushing member 578 and a shouldered end portion 580 of the rod, the folding plate unit being limited in its retracting movement by engagement of a shouldered portion of the slide member 570 with the front end of the bushing 578, as illustrated. As best shown in Fig. 16, the mechanism for extending the folding plate unit includes a horizontally mounted plunger 582 slidingly mounted in the bracket 42 and arranged to engage the extended end 575 of the central rod 574. The plunger 582 is normally maintained in a retracted position and disposed in alignment with the rod 574 when the winding head comes to rest, and, is arranged to be extended by cam operated linkage including an arm 584 fast on a pivot 585 connected to the plunger 582 by a pin and slot connection 586. A second arm 588 also fast on the pivot 585 is connected by a similar connection to a vertical plunger 590 slidingly mounted in the bracket 42 and having a roller 592 at its upper end for cooperation with a cam member 594, the plunger being urged upwardly to hold the roller against its cam by a spring 596 disposed in the end of the plunger bore, as clearly shown in Fig. 16. A third arm 598 fast on the pivot 585 is connected by a link 600 to the pivotally mounted lever 546 arranged to rock the latter upwardly when the linkage is operated to extend the folding plates, as described.

From the description thus far it will be observed that the wrapper is folded about three sides of the coiled laces with the folding plates extended as shown in Fig. 25 and the free ends of the wrapper in position to be folded and sealed into engagement with the remaining side of the laces at the end fold and heat sealing station 28, and, in practice, the folding plate unit is arranged to be maintained in its extended position during the movement of the winding head to the station 28 and also while disposed at this station by a cam piece 602 secured to the inner face of the grooved track 226, the cam piece being arranged to engage the extended end 575 of the central rod 574 when the latter slides off the horizontally mounted plunger 582 during its initial movement from the wrapping station 26.

Referring now to Figs. 27 and 28, the folding of the extended ends of the wrapper into overlapping relation against the remaining side of the laces is herein shown as being accomplished by a pair of cooperating vertically reciprocal folding plates comprising an upper folding plate 604 and a lower folding plate 606, each folding plate being carried by its individual vertically reciprocal bar 608, 610 respectively which are slidingly mounted in a bracket 612 attached to a supporting bracket 614. The lower ends of the bars 608, 610 are connected by links 616, 618 to bell cranks 620, 622 pivotally mounted at 624, and, the bars are arranged to be reciprocated to perform the folding operation by closed cams 626, 628 cooperating with cam rolls 630, 632 carried by the bell cranks 620, 622 respectively. The cams 626, 628 are mounted fast on a cam shaft 634, see Fig. 1, which is arranged to be rotated by the chain and sprocket connection 300 from the cam shaft 36, as shown in Fig. 3.

In the operation of the end folding mechanism, the lower folding plate 606 is first elevated to fold the lower extended end of the wrapper against the coiled laces, as shown in Fig. 29 and thereafter the upper folding plate 604 is lowered to fold the remaining extended end of the wrapper downwardly in overlapping relation to the first folded end, the lower folding plate 606 being gradually retracted during the descent of the upper plate 606 to hold the first folded end of the wrapper in its folded position while the remaining end is being folded, as clearly shown in Fig. 30. The completed folding operation is shown in Fig. 31, wherein the plate 604 is fully lowered and the plate 606 is completely retracted out of engagement with the wrapper. Thereafter, in the operation of the folding and heat sealing mechanism, the upper plate 604 is elevated slightly but remains in engagement with the upper portion of the folded wrapper to hold it in folded position until one of two heat sealing members 636, 638, engages the overlapping wrapper ends, as shown in Fig. 32, whereupon the upper plate 604 is fully retracted and the second heat sealing member is extended into pressure applying and heat sealing relation to the overfolded wrapper ends, as shown in Fig. 33.

As illustrated in Fig. 27, the heat sealing members 636, 638 are mounted for horizontal reciprocation in a guide member 640 which may and preferably will be heated by any usual or preferred means such as a heating coil, indicated herein at 642. The guide member 640 is supported by a bracket 644 attached to the bracket 614 and the guide member 640 may be heat insulated from the bracket 644 by interposed insulating blocks 646. The heat sealing members 636, 638 are arranged to be yieldingly urged forwardly into heat sealing engagement with the wrapper by a cam operated arm 648 extended into a cut out portion of the sealing members and arranged to enage with the ends of rods 650, 652 slidingly mounted in the sealing members. Each rod 650, 652 is provided with a spring 654 coiled thereabout and interposed between the faces defining the ends of the cut out portions of the sealing members and shouldered portions 656 formed on the rods 650, 652, as clearly shown in Fig. 27. One of the sealing members 638 comprising the lower member is normally disposed in advance of the upper sealing member 636, the springs 654 and the rods 650, 652 being proportioned to accommodate such extension so that in operation, the lower member 638 will engage the wrapper first, as illustrated in Fig. 32, while the upper folding member 604 is still in operative engagement with the wrapper, as described. Thereafter, the folding member 604 is elevated and upon further rocking of the arm 648, the upper sealing member 636 will also be yieldingly pressed against the wrapper to complete the heat sealing operation. The outer ends of the sealing members are provided with guide rods 658, 660 threaded therein and arranged to be engaged by the rear face of the rocker arm 648 to effect positive return of the sealing members at the end of the sealing operation. The arm 648 is mounted fast on one end of a shaft 662 arranged to be rocked by a cam 664 fast on the cam shaft 634 and cooperating with a cam roll 666 carried by an arm 668 fast on the other end of the rocker shaft 662.

In the continued operation of the machine, upon movement of the winding head from the end folding and heat sealing station 28, the end of the reciprocally mounted central rod 574 carried by the winding head will ride off the cam piece 602 and thus effect retraction of the wrapper folding plate unit to leave the completely wrapped package extended between the spaced winding jaws 14, 16. Upon subsequent movement of the winding head into operative relation to the discharge station 32, the jaws 14, 16 may be again extended slightly by engagement of the ball-shaped ends 272 of the bell cranks 258 with a stationary curved rail 670 in order to provide a relatively small space between the face of the winding arm and the rear face of the packaged laces to permit a stationary stripper member 672 to enter behind the package and effect stripping thereof from the jaws 14, 16 during subsequent movement of the winding head from the discharge station. As illustrated in Figs. 34 and 35, the stripper member 672 is attached to a bracket 674 and is angularly extended into the path of the oncoming winding head, the stripper being slotted, as shown at 676 to clear the jaw members as they pass thereby and to strip the package from the jaws. It will be observed that extension of the jaws at the discharge station effects a slight opening thereof to release the gripped ends of the laces.

Referring now to Fig. 36, a modified form of wrapper applying mechanism is therein illustrated which includes a horizontal guide comprising a pair of relatively thin spaced blades 680, 682 arranged to embrace the top and bottom of the coil carried by the winding head as it is moved from the winding station to the wrapping station. The blades 680, 682 are arranged to support the coil during the application of the wrapper about three sides of the coil. As previously stated, the trailing tipped ends of the coiled laces are arranged to extend rearwardly from the forward or leading end of the winding head and on the underside of the coil. In the modified form of the invention herein illustrated, the blades 680, 682 are arranged to be extended to receive the coil therebetween as the winding head is moved into operative position to the wrapping station, and, the trailing ends of the coil are thus maintained in contiguous engagement with the underside of the coil during the wrapping operation.

As herein illustrated, the blades 680, 682 are carried by a slide member 684 arranged to be reciprocated into and out of coil receiving and engaging position by a cam 686 fast on the cam shaft 464 and through connections including a cooperating cam roll 688 carried by a lever 690 pivotally mounted at 692, and a link 694 connecting the lever to the slide member 684. As shown in Fig. 37, the slide member 684 is slidingly supported on top of a second slide member comprising the backing member 696 and is guided between hexagonal members 698 secured to the slide member 696. A spring 700 connected to the arm 690 is provided to hold the roller 688 against its cam.

The backing member, as previously described, is arranged to push the coil back against the front face of the winding arm after the wrapper blank has been introduced between the arm and the back of the coil, and, in the modified embodiment illustrated in Fig. 37 the face of the backing member 696 extends across the full length of the coil and is provided with a central portion 702 extending between the blades 680, 682. The extreme end portions of the backing member may be provided with slotted portions 704 to provide clearance for the ends of the winding jaws when the backing member is advanced to push the coil back against the face of the winding arm. As also shown in Fig. 37, the coil receiving ends of the spaced blades 680, 682 are preferably flared as indicated at 681. The blades may and preferably will be yieldingly retained on their supporting member by spring units, indicated at 683 to effect yielding engagement of the blades against the top and bottom of the coil and to accommodate coils which may vary slightly in thickness.

As herein shown, the backing member 696 is slidingly mounted in the bracket 538 and is arranged to be reciprocated by a cam 706, fast on the cam shaft 464, and a cooperating roller 708 carried by a lever 710 pivotally mounted at 692. A link 712 connects the lever 710 and the slide 696 and a spring 714 may be provided to hold the roller 708 against its cam.

In the modified embodiment of the invention as illustrated in Fig. 36, the wrapper creasing mechanism 500, 502, and the wrapper cut off blade 508 are arranged to be operated by the cam 516 through linkages similar to those shown in Fig. 21 except that the cam lever 520 is cut off at its lower end, below the cam roll 518 to permit independent operation of the horizontal guide blades, as described, and, the spring and rod connection 542 for maintaining the cam roll 518 in operative engagement with its cam is moved to a position above the cam roll 518, as illustrated in Fig. 36.

From the above description of the modified embodiment of the wrapper applying mechanism, it will be seen that, in operation, the guide blades 680, 682 are extended in the path of the coil to receive the same therebetween as the winding head is advanced to the wrapping station, and, when the winding head comes to rest, the pre-creased wrapper web is advanced into operative position to be applied to the coil. Thereafter, and, prior to the severing operation, the backing member 696 is extended to push the coil back on the winding jaws, the wrapper being thus firmly held between the front face of the winding arm and the coil. The guide blades 680, 682 may be slightly and simultaneously extended to follow along with the coil as it is pushed back whereupon the wrapper is severed from the web, the parts being in the position shown in Fig. 38 at this time. The folding plates 556, 558 are now extended to fold the extended ends of the wrapper over the ends of the guide blades 680, 682 embracing the coil, as shown in Fig. 39. The guide blades 680, 682 may now be retracted to permit the folded portions of the wrapper to come into engagement with the top and bottom of the coil while the backing member remains in position to hold the coil in place, as shown in Fig. 40, whereupon, the backing member may be retracted to permit the extended ends of the wrapper to assume the position shown in Fig. 41, in readiness to be folded in overlapping relation and sealed against the outer face of the coil at the succeeding station of operation. Thus, it will be seen that in the modified form of wrapper applying mechanism, the coil is held by the guide blades to maintain the tipped ends of the laces in contiguous engagement against the underside of the coil during the wrapping operation, and, the wrapper may be positively gripped between the coil and the winding arm prior to being severed from the web.

While the preferred embodiment of the invention has been herein illustrated and described, it will be understood that the invention may be embodied in other forms within the scope of the following claims.

Having thus described the invention, what is claimed is:

1. In a shoe lace packaging machine, in combination, a winding head, supporting means for a supply of laces, means carried by the winding head adapted to receive and grip the foremost pair of laces in the supply, means for rotating the winding head to form an elongate duplex coil, and means for applying a wrapper about the central portion of the duplex coil while supported on said winding head.

2. In a shoe lace packaging machine, in combination, a winding head, supporting means for a supply of laces, means carried by the winding head adapted to receive and grip the foremost pair of laces in the supply, means for rotating the winding head to form an elongate duplex coil, means for feeding a wrapper into operative position to be wrapped about the coil, and means for applying the wrapper about the coil while supported on the winding head.

3. In a shoe lace packaging machine, in combination, a winding head, supporting means for a supply of laces, means carried by the winding head adapted to receive and grip the foremost pair of laces in the supply, means for rotating the winding head to form an elongate duplex coil, means for feeding a wrapper into operative position to be wrapped about the coil, means for applying the wrapper about three sides of the coil with the free ends of the wrapper extended, means for folding the free ends of the wrapper in overlapping relation against the remaining side of the coil, and means for sealing the overlapped portions of the wrapper while supported on the winding head.

4. In a shoe lace packaging machine, in combination, a winding head, supporting means for a supply of laces, means carried by the winding head adapted to receive and grip the foremost pair of laces in the supply, means for rotating the winding head to form an elongate duplex coil, means for feeding a wrapper into operative position to be wrapped about the coil, means for applying the wrapper about three sides of the coil with the free ends of the wrapper extended, means for folding the free ends of the wrapper in overlapping relation against the remaining side of the coil, and means for sealing the overlapped portions of the wrapper while supported on the winding head, and means for removing the wrapped package from the winding head.

5. In a shoe lace packaging machine, in combination, a winding head, supporting means for a supply of laces, means carried by the winding head adapted to receive and grip the foremost pair of laces in the supply, means for rotating the winding head to form an elongate duplex coil, means for feeding a wrapper into operative position to be wrapped about the coil, means carried by the winding head for applying the wrapper about three sides of the coil with the free ends of the wrapper extended, means for folding the free ends of the wrapper in overlapping relation against the remaining side of the coil, and means for sealing the overlapped portions of the wrapper while supported on the winding head.

6. In a shoe lace packaging machine, in combination, a winding head, supporting means for a supply of laces, means carried by the winding head adapted to receive and grip the foremost pair of laces in the supply, means for rotating the winding head to form an elongate duplex coil, means for forming and feeding a pre-creased wrapper into operative position to be wrapped about the coil with the pre-creased portions of the wrapper conforming to the corner edges of the coil to be wrapped, and means for applying the wrapper about the coil while supported on the winding head.

7. In a shoe lace packaging machine, in combination, a winding head having a pair of gripper jaws mounted for extension and retraction, supporting means for a supply of laces, means for extending and retracting said jaws to receive and grip the foremost pair of laces in the supply, means for rotating the winding head to form an elongated duplex coil, and means for applying a wrapper about the coil while supported on said winding head.

8. In a shoe lace packaging machine, in combination, a winding head having a pair of gripper jaws mounted for extension and retraction in the winding head, means for feeding laces supported at one end in single file and in edge to edge relation to present the foremost pair of laces into operative relation to the winding head, means for extending and retracting said jaws to receive and grip the foremost pair of laces presented thereto, means for rotating the winding head to effect coiling of the laces on the winding head to form an elongate duplex coil, and means for applying a wrapper about the coil while supported on said winding head.

9. In a shoe lace packaging machine, lace feeding mechanism comprising a pair of rails spaced apart substantially the thickness of the individual laces but less than the diameter of the tip portions, the spaced rails forming a guideway for supporting the laces suspended by their tips from the rails with the tips in engagement with the upper surfaces of the guideway, means for advancing the laces in single file and edge to edge relation in the guideway, and means for releasing successive foremost pairs of laces from the guideway.

10. In a shoe lace packaging machine, lace feeding mechanism comprising a pair of spaced rails forming a guideway arranged to support the laces suspended from one of their ends, means for advancing the laces in single file and edge to edge relation in the guideway, and means for releasing successive foremost pairs of laces in the guideway, said lace advancing means comprising a pair of opposed conveying bands in frictional engagement with the laces.

11. In a shoe lace packaging machine, lace feeding mechanism comprising a pair of spaced rails forming a guideway arranged to support the laces suspended from one of their ends, means for advancing the laces in single file and edge to edge relation in the guideway, and means for releasing successive foremost pairs of laces in the guideway, said lace advancing means comprising a pair of opposed conveying bands in frictional engagement with the laces, and means for pressing the portions of the band in engagement with the laces toward one another.

12. In a shoe lace packaging machine, lace feeding mechanism comprising a pair of rails spaced apart substantially the thickness of the individual laces but less than the diameter of the tip portions, the spaced rails forming a guideway for supporting the laces suspended from the rails with the tips in engagement with the upper surfaces of the guideway, means engageable with the suspended portions of the laces for yieldingly urging the same downwardly in the guideway to force the tips into engagement with the upper surfaces thereof, means for advancing the laces in single file and edge to edge relation in the guideway, and means for releasing successive foremost pairs of laces from the guideway.

13. In a shoe lace packaging machine, lace feeding mechanism comprising a pair of spaced rails forming a guideway arranged to support the laces suspended from one of their ends, means for advancing the laces in single file and edge to edge relation in the guideway, and means for releasing successive foremost pairs of laces in the guideway, said releasing means comprising a gate arranged to be opened to permit withdrawal of the foremost pair of laces, and a detaining member engageable with the second foremost pair of laces for preventing advance of the remainder of the line during such withdrawal.

14. In a shoe lace packaging machine, in combination, a winding head having a pair of gripper jaws adapted to be extended to grip a pair of laces presented thereto, and means for supporting and advancing laces into operative position to be withdrawn by said gripper jaws comprising a pair of guide rails spaced apart substantially the thickness of the individual laces to form a guideway for suspending laces therein with the tips in engagement with the upper surfaces of the guide rails, means for advancing the laces in single file and edge to edge relation in said guideway comprising a pair of opposed conveying bands in frictional engagement with the laces, and means for releasing successive foremost pairs of laces to permit withdrawal thereof by said gripper jaws.

15. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head.

16. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head, and means for extending one pair of jaws to receive and grip a pair of laces presented thereto.

17. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head, and means for extending one pair of jaws to receive and grip a pair of laces presented thereto, and means for rotating the winding head to effect winding of the laces about and extended between said two pairs of gripper jaws to form an elongate duplex coil.

18. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head, and means for extending one pair of jaws to receive and grip a pair of laces presented thereto, and means for rotating the winding head to effect winding of the laces about and extended between said two pairs of gripper jaws to form an elongate duplex coil, and resilient means engageable with the trailing portions of the laces for flattening and tensioning the laces during the winding operation.

19. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head, and means for extending one pair of jaws to receive and grip a pair of laces presented thereto, and means for rotating the winding head to effect winding of the laces about and extended between said two pairs of gripper jaws to form an elongate duplex coil, and a yieldable strap cooperating with the winding head for maintaining the laces taut upon and in parallel relation to said jaws during the winding operation.

20. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head, and means for extending one pair of jaws to receive and grip a pair of laces presented thereto, and means for rotating the winding head to effect winding of the laces about and extended between said two pairs of gripper jaws to form an elongate duplex coil, and a yieldable strap cooperating with the winding head for maintaining the laces taut upon and in parallel relation to said jaws during the winding operation, and means for applying and sealing a wrapper about the central portion of the elongated coil while supported on said winding head.

21. In a shoe lace packaging machine, a rotatable winding head having two pairs of gripper jaws mounted for extension and retraction in the winding head, each pair of gripper jaws comprising a relatively stationary jaw and a movable jaw, means carried by the winding head for opening the jaws upon extension thereof and arranged to permit closing of the jaws upon reaching the limit of extension, and means for maintaining the jaws closed during retraction thereof in the winding head, and means for extending one pair of jaws to receive and grip a pair of laces presented thereto, and means for rotating the winding head to effect winding of the laces about and extended between said two pairs of gripper jaws to form an elongate duplex coil, means for thereafter partially extending the jaws with the coil supported thereon to provide a space between the winding head and the central portion of the laces, means for feeding a wrapper into said space and in operative position to be wrapped about the coil, a pair of folding mounters reciprocally mounted in the winding head and arranged to be extended to effect application of the wrapper about three sides of the coil while supported on the winding head, and means for folding and sealing the free ends of the wrapper in overlapping relation against the remaining side of the coil.

22. In a shoe lace packaging machine, means for supporting an elongate duplex coil of laces, means for advancing a web of wrapping material one wrapper length to present the endmost wrapper portion in operative position to be wrapped about the coil, means for forming transverse crease lines upon successive wrapper forming portions of the web, the crease lines conforming to the edges of the central portion of the coil, means for severing the endmost wrapper portion, and means for applying the wrapper about the coil.

23. In a shoe lace packaging machine, a winding head supporting an elongated duplex coil of laces, means for extending the coil from the head to provide a space behind the coil, means for advancing a web of wrapping material to present the endmost wrapper portion into said space and in operative position to be wrapped about the coil, means for forming transverse crease lines upon successive wrapper forming portions of the web, the crease lines conforming to the edges of the elongated coil, means for forming a longitudinal bend in the web after the creasing operation to lend rigidity thereto during subsequent advancement, means for returning the extended coil against the head to support the wrapper in said operative position, means for severing the wrapper from the web, means carried by the winding head for applying the wrapper about the coil, and means for thereafter folding and sealing the free ends of the wrapper in overlapping relation against the coil.

24. In apparatus of the character described, a rotatable winding head having means for supporting a pair of laces and being mounted for intermittent movement through successive stations for performing the packaging operations, means for maintaining the winding head in a horizontal position during intermittent movement from one station to another including a stationary track and a guide member carried by the winding head cooperating with said track.

25. In apparatus of the character described, a rotatable winding head having means for supporting a pair of laces and being mounted for intermittent movement through successive stations for performing the packaging operations, means for maintaining the winding head in a horizontal position during intermittent movement from one station to another including a stationary track and a guide member carried by the winding head cooperating with said track, said track being interrupted at one station, and means for rotating the winding head at said one station including a driving element disposed in said interrupted portion of the track and arranged to cooperate with said guide member.

26. In apparatus of the character described, a rotatable winding head having means for supporting a pair of laces and being mounted for intermittent movement through successive stations for performing the packaging operations, means for maintaining the winding head in a horizontal position during intermittent movement from one station to another including a stationary track and a guide member carried by the winding head cooperating with said track, said track being interrupted at one station, and means for rotating the winding head at said one station including a driving element disposed in said interrupted portion of the track and arranged to cooperate with said guide member, and a cam operated clutch for controlling said driving element.

27. In apparatus of the character described, a rotatable winding head having means for supporting a pair of laces and being mounted for intermittent movement through successive stations for performing the packaging operations, means for maintaining the winding head in a horizontal position during intermittent movement from one station to another including a stationary track and a guide member carried by the winding head cooperating with said track, said track being interrupted at one station, and means for rotating the winding head at said one station including a driving element disposed in said interrupted portion of the track and arranged to cooperate with said guide member, and a cam operated clutch for controlling said driving element, and an indexing member associated with said cam operated clutch arranged to effect termination of rotation of the winding head in a horizontal position.

28. A shoe lace packaging machine having in combination, a lace receiving station, a winding station, a wrapper applying station, and a sealing station, a plurality of winding heads mounted for intermittent movement through successive stations for performing the packaging operation, means carried by the winding head adapted to grip a pair of laces presented thereto at the receiving station, a stationary guide member arranged to separate the trailing portions of the laces during movement of the winding head from the receiving station to the winding station, and means for rotating the winding head at the winding station to effect coiling of the laces to form an elongated duplex coil, and means for maintaining the free ends of the laces in engagement with the coil during movement of the winding head from the winding station to the wrapping station, and means for applying a wrapper about the central portion of the elongated coil while supported on said winding head.

29. In apparatus of the character described, a winding head supporting an elongated duplex coil of laces and mounted for intermittent movement through successive stations for performing the packaging operation, means for feeding a wrapper behind the laces supported in the winding head to present the wrapper in operative position to be wrapped about the coil, wrapper folding plates mounted for reciprocation in the winding head, means for extending the folding plates at the wrapping station to apply the wrapper about three sides of the coil, said folding plates supporting the partially wrapped coil, means for maintaining the folding plates extended during movement of the winding head, and means for folding and sealing the free ends of the wrapper in overlapping relation against the remaining side of the coil while supported by said folding plate.

30. In apparatus of the character described, a winding head supporting an elongated duplex coil of laces and mounted for intermittent movement through successive stations for performing the packaging operation, means for feeding a wrapper behind the laces supported in the winding head to present the wrapper in operative position to be wrapped about the coil, wrapper folding plates mounted for reciprocation in the winding head, means for extending the folding plates at the wrapping station to apply the wrapper about three sides of the coil, said folding plates supporting the partially wrapped coil, means for maintaining the folding plates extended during movement of the winding head, and means for folding and sealing the free ends of the wrapper in overlapping relation against the remaining side of the coil while supported by said folding plate, and a stationary member engageable behind the laces to effect removal of the completely wrapped package from the winding head during subsequent movement of the head.

31. In apparatus of the character described, a winding head supporting an elongated duplex coil of laces, a pair of spaced and relatively thin blades embracing the top and bottom of the coil for maintaining the free ends of the laces in contiguous engagement with the coil, means for feeding a wrapper behind the laces supported in the winding head to present the wrapper in operative position to be wrapped about the coil, means carried by the winding head for folding the extended ends of the wrapper over the blades embracing the coil, means for thereafter retracting said blades to permit the folded portions of the wrapper to rest against the top and bottom of the coil, and means for folding and sealing the free ends of the wrapper in overlapping relation against the remaining side of the coil.

32. In apparatus of the character described, a winding head supporting an elongated duplex coil of laces and mounted for intermittent movement through successive stations for performing the packaging operation, a pair of relatively thin spaced blades disposed at the wrapping station adapted to receive and embrace the top and bottom of the coil as the winding head is moved into operative position to said wrapping station, said blades supporting the free ends of the laces in contiguous engagement with the coil, means for feeding a wrapper behind the laces supported in the winding head to present the wrapper in operative position to be wrapped about the coil, a pair of folding plates carried by the winding head arranged to fold the extended ends of the wrapper about three sides of the coil while still supported by said blades, means for thereafter retracting the blades to permit the folded portions of the wrapper to rest against the top and bottom of the coil and about the free ends of the laces, and means for folding and sealing the free ends of the wrapper in overlapping relation against the remaining side of the coil.

33. In apparatus of the character described, a winding head supporting an elongated coil, a pair of spaced and relatively thin blades embracing the top and bottom of the coil for supporting the coil during the preliminary wrapping operation and for maintaining the free ends of the laces in contiguous engagement with the coil, means for extending the coil from the head to provide a space behind the coil, means for advancing a web of wrapping material to move the endmost wrapper portion into said space and in operative position to be wrapped about the coil, means for returning the extended coil against the head to support the wrapper in said operative position, means for thereafter severing the wrapper from the web, folding plates carried by the winding head arranged to fold the wrapper against one side of the coil and over the ends of the blades embracing the coil, means for thereafter retracting the blades and said coil returning means to permit the folded portions of the wrapper to engage the top and bottom of the coil and about the free ends of the laces, and means for folding and sealing the free ends of the wrapper in overlapping relation against the remaining side of the coil while supported by said folding plates.

34. In apparatus of the character described, a winding head supporting an elongated duplex coil of laces and mounted for intermittent movement through successive stations for performing the packaging operation, a pair of spaced relatively thin blades disposed at the wrapping station adapted to receive and embrace the top and bottom of the coil as the winding head is moved into operative position to said wrapping station, said blades supporting the free ends of the laces in contiguous engagement with the coil, means for extending the coil from the head to provide a space behind the coil, means for advancing a web of wrapping material to present the endmost wrapper portion into said space and in operative position to be wrapped about the coil, means for returning the extended coil against the head to support the wrapper between the coil and the head, means for severing the wrapper from the web, folding plates reciprocally mounted in the winding head and arranged to fold the wrapper against one side of the coil and over the ends of the blades embracing the coil, means for thereafter retracting the blades and said coil returning means to permit the folded portions of the wrapper to engage the top and bottom of the coil and about the free ends of the laces, and means for folding and sealing the free ends of the wrapper in overlapping relation against the remaining side of the coil while supported by said folding plates.

35. In apparatus of the character described, an intermittently movable winding head supporting an elongated duplex coil of laces to be wrapped, means disposed at the wrapping station adapted to receive and embrace the top and bottom of the coil including the free ends of the laces as the winding head is moved into the wrapping station, means for applying a wrapper against one side of the coil and over said embracing means, means for thereafter retracting said embracing means to permit the folded portions of the wrapper to engage the top and bottom of the coil, and means for folding and sealing the free ends of the wrapper in overlapping relation against the remaining side of the coil.

JAMES P. WHELAN.

REFERENCES CITED

The following references are of record in the file of this patent:

UNITED STATES PATENTS

| Number | Name | Date |
|---|---|---|
| 1,927,708 | Pieczentkowski | Sept. 19, 1933 |
| 1,934,471 | Kerr | Nov. 7, 1933 |
| 1,949,544 | Matson | Mar. 6, 1934 |
| 2,177,130 | Andren | Oct. 24, 1939 |
| 2,307,530 | Moe | Jan. 5, 1943 |
| 2,331,004 | Standish | Oct. 5, 1943 |